US010628391B1

(12) United States Patent
Bent et al.

(10) Patent No.: US 10,628,391 B1
(45) Date of Patent: Apr. 21, 2020

(54) METHOD AND SYSTEM FOR REDUCING METADATA OVERHEAD IN A TWO-TIER STORAGE ARCHITECTURE

(71) Applicant: EMC Corporation, Hopkinton, MA (US)

(72) Inventors: John M. Bent, Los Alamos, NM (US); Sorin Faibish, Newton, MA (US); Dennis Pei Jean Ting, Groton, MA (US); Uday K. Gupta, Westford, MA (US); Percy Tzelnic, Cambridge, MA (US); Gary Grider, Los Alamos, NM (US); David J. Bonnie, Los Alamos, NM (US)

(73) Assignees: EMC IP Holding Company LLC, Hopkinton, MA (US); Triad National Security, LLC, Los Alamos, NM (US)

( * ) Notice: Subject to any disclaimer, the term of this patent is extended or adjusted under 35 U.S.C. 154(b) by 394 days.

(21) Appl. No.: 14/870,968

(22) Filed: Sep. 30, 2015

(51) Int. Cl.

| | |
|---|---|
| ***G06F 16/16*** | (2019.01) |
| ***G06F 16/185*** | (2019.01) |
| ***G06F 16/14*** | (2019.01) |
| ***G06F 16/22*** | (2019.01) |

(52) U.S. Cl.
CPC .......... *G06F 16/185* (2019.01); *G06F 16/148* (2019.01); *G06F 16/166* (2019.01); *G06F 16/2246* (2019.01)

(58) Field of Classification Search
CPC ......... G05F 17/30091; G05F 17/30224; G05F 17/30115
See application file for complete search history.

(56) References Cited

U.S. PATENT DOCUMENTS

| | | | | |
|---|---|---|---|---|
| 8,769,105 | B2 * | 7/2014 | Lacapra | H04L 67/1097 709/226 |
| 8,880,476 | B2 * | 11/2014 | Noronha | G06F 3/0641 707/649 |
| 9,122,606 | B2 * | 9/2015 | Sundrani | G06F 12/0804 |
| 9,298,733 | B1 * | 3/2016 | Faibish | G06F 17/30224 |
| 9,454,331 | B1 * | 9/2016 | Bent | G06F 3/067 |
| 9,535,856 | B2 * | 1/2017 | Coronado | G06F 12/1491 |
| 9,659,019 | B1 * | 5/2017 | Bent | G06F 17/30091 |
| 10,216,651 | B2 * | 2/2019 | Ashmore | G06F 12/16 |
| 10,296,494 | B2 * | 5/2019 | Davis | G06F 16/182 |

(Continued)

OTHER PUBLICATIONS

Global Namespace, The future of distributed file server Management, Rahul Mehta, Tidawire (Year: 2003).*

*Primary Examiner* — Jean M Corrielus
(74) *Attorney, Agent, or Firm* — Ryan, Mason & Lewis, LLP

(57) ABSTRACT

Example embodiments of the present invention relate to a method, a system, and a computer program product for maintaining dynamically loadable namespaces. The method includes presenting, to an application, a file system having a global single namespace (SN) comprising a plurality of dynamically-loadable namespaces (DLNs) maintained in a capacity tier (CT) of object storage of a storage system. In response to a job submitted by the application, dynamically loading a first dynamically-loadable namespace, including the metadata only for the first dynamically-loadable namespace, associated with the job from the capacity tier of object storage into a fast tier (FT) of storage of the storage system.

20 Claims, 18 Drawing Sheets

(56) References Cited

U.S. PATENT DOCUMENTS

2008/0065583 A1* 3/2008 Coverston ......... G06F 17/30115
2012/0030179 A1* 2/2012 Kauffman ......... G06F 17/30091 707/654
2013/0117515 A1* 5/2013 Ashmore ................ G06F 12/16 711/162
2013/0132674 A1* 5/2013 Sundrani ............. G06F 12/0804 711/122
2014/0082145 A1* 3/2014 Lacapra .............. H04L 67/1097 709/219
2014/0282615 A1* 9/2014 Cavage ..................... G06F 9/54 719/316
2014/0297734 A1* 10/2014 Lacapra .............. H04L 67/1097 709/203
2015/0039837 A1* 2/2015 Quan ...................... G06F 3/061 711/136
2015/0281360 A1* 10/2015 Lacapra .............. H04L 67/1097 709/203
2015/0286413 A1* 10/2015 Olson ................... G06F 16/119 711/103
2015/0293984 A1* 10/2015 Zolotusky, Jr. ..... H04L 67/1097 707/634
2015/0381725 A1* 12/2015 Haapaoja ............ H04L 67/1097 709/213

* cited by examiner

IMPORTING A DLN INTO THE FT

OPENING A NEW FILE FOR WRITING

WRITING TO A FILE

FLUSHING DIRTY DATA

OPEN ATTEMPT ON NON-EXISTENT FILE

READ OPEN OF A FILE RESIDENT IN THE FT

READ OPEN OF A FILE ON THE CT ONLY

READING A FILE THROUGH THE 2T INTERFACE

FREEING FT CAPACITY BY EVICTING DATA

FREEING FT CAPACITY BY EVICTING 2T METADATA

1200

| inum | reclen | strlen | name |
|---|---|---|---|
| 5 | 4 | 2 | . |
| 2 | 4 | 3 | .. |
| 12 | 16 | 12 | data.0000001 |
| 13 | 16 | 12 | data.0000002 |
| ... | ... | ... | ... |
| 1000011 | 16 | 12 | data.1000000 |

| inum | reclen | strlen | name |
|---|---|---|---|
| 5 | 4 | 2 | . |
| 2 | 4 | 3 | .. |
| [12..1000011] | 24 | 23 | data.[0000001..1000000] |

| inum | reclen | strlen | name |
|---|---|---|---|
| 5 | 4 | 2 | . |
| 2 | 4 | 3 | .. |
| [12..500011] | 24 | 23 | data.[0000001..0499999] |
| 500012 | 16 | 12 | foo |
| [500013..1000011] | 24 | 23 | data.[0500001..1000000] |

FIG. 14

METHOD AND SYSTEM FOR REDUCING METADATA OVERHEAD IN A TWO-TIER STORAGE ARCHITECTURE

ACKNOWLEDGMENT OF GOVERNMENT SUPPORT

This invention was made with government support under Contract No. 89233218CNA000001 awarded by the U.S. Department of Energy/National Nuclear Safety Administration. The government has certain rights in the invention.

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This application relates to data storage.

BACKGROUND

Computer systems are constantly improving in terms of speed, reliability, and processing capability. As is known in the art, computer systems which process and store large amounts of data typically include one or more processors in communication with a shared data storage system in which the data is stored. The data storage system may include one or more storage devices, usually of a fairly robust nature and useful for storage spanning various temporal requirements, e.g., disk drives. The one or more processors perform their respective operations using the storage system. Mass storage systems (MSS) typically include an array of a plurality of disks with on-board intelligent and communications electronics and software for making the data on the disks available.

Companies that sell data storage systems and the like are very concerned with providing customers with an efficient data storage solution that minimizes cost while meeting customer data storage needs. It would be beneficial for such companies to have a way for reducing the complexity of implementing data storage.

SUMMARY

Example embodiments of the present invention relate to a method, a system, and a computer program product for maintaining dynamically loadable namespaces. The method includes presenting, to an application, a file system having a global single namespace (SN) comprising a plurality of dynamically-loadable namespaces (DLNs) maintained in a capacity tier (CT) of object storage of a storage system. In response to a job submitted by the application, dynamically loading a first dynamically-loadable namespace, including the metadata only for the first dynamically-loadable namespace, associated with the job from the capacity tier of object storage into a fast tier (FT) of storage of the storage system.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every Figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

FIG. 12 is an illustration of file system directory metadata for a plurality of files according to an example embodiment of the present invention;

FIGS. 13 and 14 are illustrations of file system directory metadata for a plurality of files including a computed representative metadata entry according to respective example embodiments of the present invention;

DETAILED DESCRIPTION

Object-scale storage systems may be billions if not trillions of objects. Further, while file system interfaces are ubiquitous and present greater usability, one of ordinary skill in the art will appreciate that limitations in file systems (e.g., Lustre, GPFS), such as a limited set of inodes, render traditional file system interfaces inoperable for accessing trillion-scale object stores. While objects stores excel as a capacity storage solution, they are not as usable or familiar to users as file system interfaces. Further, although most users only care about data, a common bottleneck in storage systems is often metadata which is directly related to the number of entries in the storage system. Accordingly, it would be advantageous to be able to present a file system interface on top of, for example, a trillion-scale object store to provide added usability but with the scalability of object stores but without the bottleneck of an overwhelming amount of metadata (either in terms of performance or capacity required to store the metadata).

Accordingly, example embodiments of the present invention layer a file system over an object store. As will be described in greater detail below, the file system may have a global single namespace (SN) comprising a plurality of dynamically-loadable namespaces (DLNs) maintained in the capacity tier of object storage in the distributed storage system. In response to a job submitted by an application on a client node, the distributed storage system may dynamically load a particular dynamically-loadable namespace, including metadata only for that dynamically-loadable namespace, associated with the job from the capacity tier of object storage into the fast tier of storage for the storage system. Therefore, only a dynamic subset of the data in the capacity tier has metadata in the acceleration tier.

Figure 1:
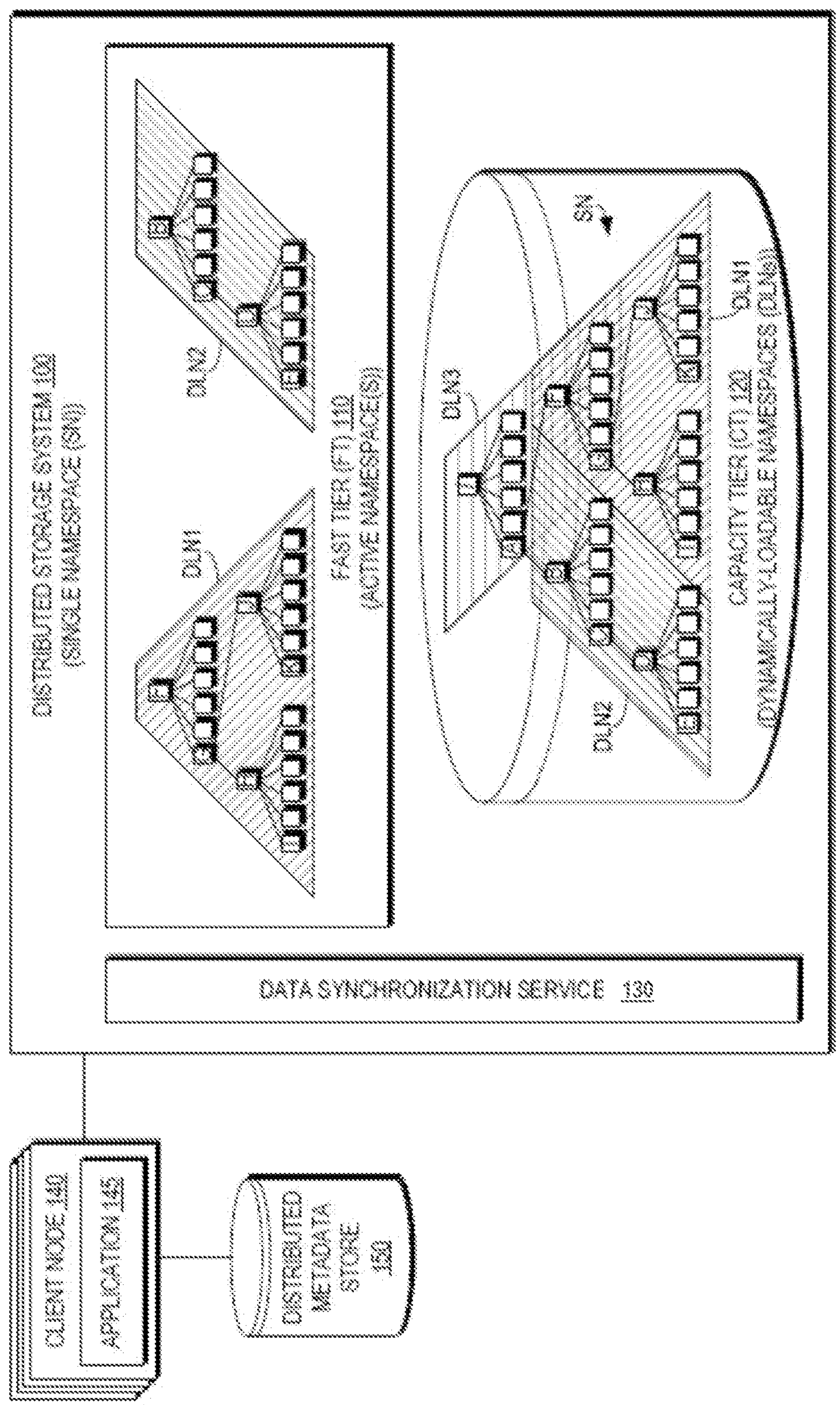
FIGS. 1 and 2 are block diagrams of a two-tier distributed storage system having a single namespace comprised of a plurality of dynamically-loadable namespaces according to respective example embodiments of the present invention.

FIG. 1 is a block diagram of a two-tier distributed storage system 100 having a single namespace (SN) comprised of a plurality of dynamically-loadable namespaces (DLNs) DLN1, DLN2, DLN3 according to an example embodiment of the present invention. It should be understood that, among other benefits, retaining a single namespace allows unmodified applications to run anywhere without any required knowledge about data locality. As illustrated in FIG. 1, the two-tier distributed storage system 100 comprises a first performance (fast) tier (FT) 110 that employs memory based on performance considerations (e.g., access times) and a second capacity tier (CT) 120 that employs storage based on capacity considerations. In this manner, the two-tier distributed storage system 100 balances between the relative costs of memory and other storage and their relative speeds. It is to be appreciated that more than two storage tiers 110, 120 may be used in other embodiments. As will be described in greater detail below, the distributed storage system 100 may be accessed by client nodes 140 running client applications 145 relying on a distributed metadata store 150 to identify nodes of the distributed storage system 100 responsible for respective files of the single namespace.

The distributed storage system 100 may have a global single namespace (SN) comprised of a plurality of dynamically-loadable namespaces (DLNs) maintained in the capacity tier 120 with one or more active namespaces loaded into the fast tier 110. The distributed storage system 100 also may include a data synchronization service 130 configured to copy the data from the fast tier 110 to the disk-based object storage in the capacity tier (CT) 120 to free the data from, for example, the flash storage in the performance tier 110 when additional capacity in the performance tier 110 is required.

As illustrated in FIG. 1, the capacity tier 120 may store objects storing the plurality of dynamically-loadable namespaces (DLNs) comprising the single namespace (SN). For example, the single namespace may describe the file system shown in FIG. 1 with a root (/) and directories A, B, C, D, E, F, G, H, I, J, and K. According to an example embodiment of the present invention, however, the single namespace may be partitioned into a plurality of dynamically-loadable namespaces: DLN1 may describe directories F, G, H, I, J, and K; DLN2 may describe directories B, C, D, and E; and DLN3 may describe the root (/), A, F, and G directories. While a dynamically-loadable namespace is on the fast tier 110, it's a namespace; while a dynamically-loadable namespace is on the capacity tier 120, it's just an object identifier (OID).

To ensure that all jobs on the system can see the entire system as they would expect when run on a monolithic system, the DLNs of different jobs can overlap. In other words, it should be understood that respective portions of the single namespace may reside in a plurality of dynamically-loadable namespaces (e.g., directories F and G are in both DLN1 and DLN3). This means that loading a DLN into the FT 110 requires that it be visible across the entire FT 110; presumably this implies that the DLN be distributed across the complete set of data nodes (e.g., not just the set of data nodes servicing that job) as will be described in greater detail below with respect to FIG. 2.

The exemplary performance (fast) tier (FT) 110 comprises flash memory, such as a DSSD™ flash storage system, commercially available from EMC Corporation of Hopkinton, Mass., or other high-speed memory having a substantially lower access time than the capacity tier (CT) 120. Although flash memory will often be used, other types of low-latency memory could be used instead of flash memory. Typically, such low-latency memories comprise electronic memories, which may be implemented using non-volatile memories, volatile memories, or combinations of non-volatile and volatile memories.

The exemplary capacity tier (CT) 120 may be implemented, for example, using a Distributed Application Object Storage (DAOS) Object Store, proposed by Intel Corporation; a multi disk storage tier, such as an Isilon® storage array, commercially available from EMC Corporation of Hopkinton, Mass.; or ViPR®, a Software-Defined Storage product commercially available from EMC Corporation of Hopkinton, Mass. that abstracts storage from disparate arrays into a single pool of storage capacity.

While example embodiments of the present invention are illustrated herein using multiple storage tiers comprised of a plurality of exemplary storage technologies, such as flash storage, other storage technologies can be employed in each tier, as would be apparent to a person of ordinary skill in the art. In addition, while example embodiments of the present invention are illustrated herein using multiple storage tiers to store, for example, a checkpoint, example embodiments of the present invention also apply to the storage of other data, such as other bursty input/output (I/O) tasks, as would be apparent to a person of ordinary skill in the art.

Example embodiments of the present invention are described herein with reference to an exemplary MapReduce compute architecture and associated compute nodes, storage systems, applications and other processing devices. It is to be appreciated, however, that the invention is not restricted to use with the particular illustrative MapReduce architecture and device configurations shown. Accordingly, the terms "job scheduler" and "job tracker" as used herein are intended to be broadly construed, so as to encompass, for example, other job scheduling entities in a batch system, a distributed resource management system (DRMS), or a distributed resource manager (DRM), as would be apparent to a person of ordinary skill in the art. Likewise, the term "data node" as used herein is intended to be broadly construed, so as to encompass, for example, other storage nodes in a job scheduling system, a batch system, a distributed resource management system (DRMS), or a distributed resource manager (DRM).

Figure 2:
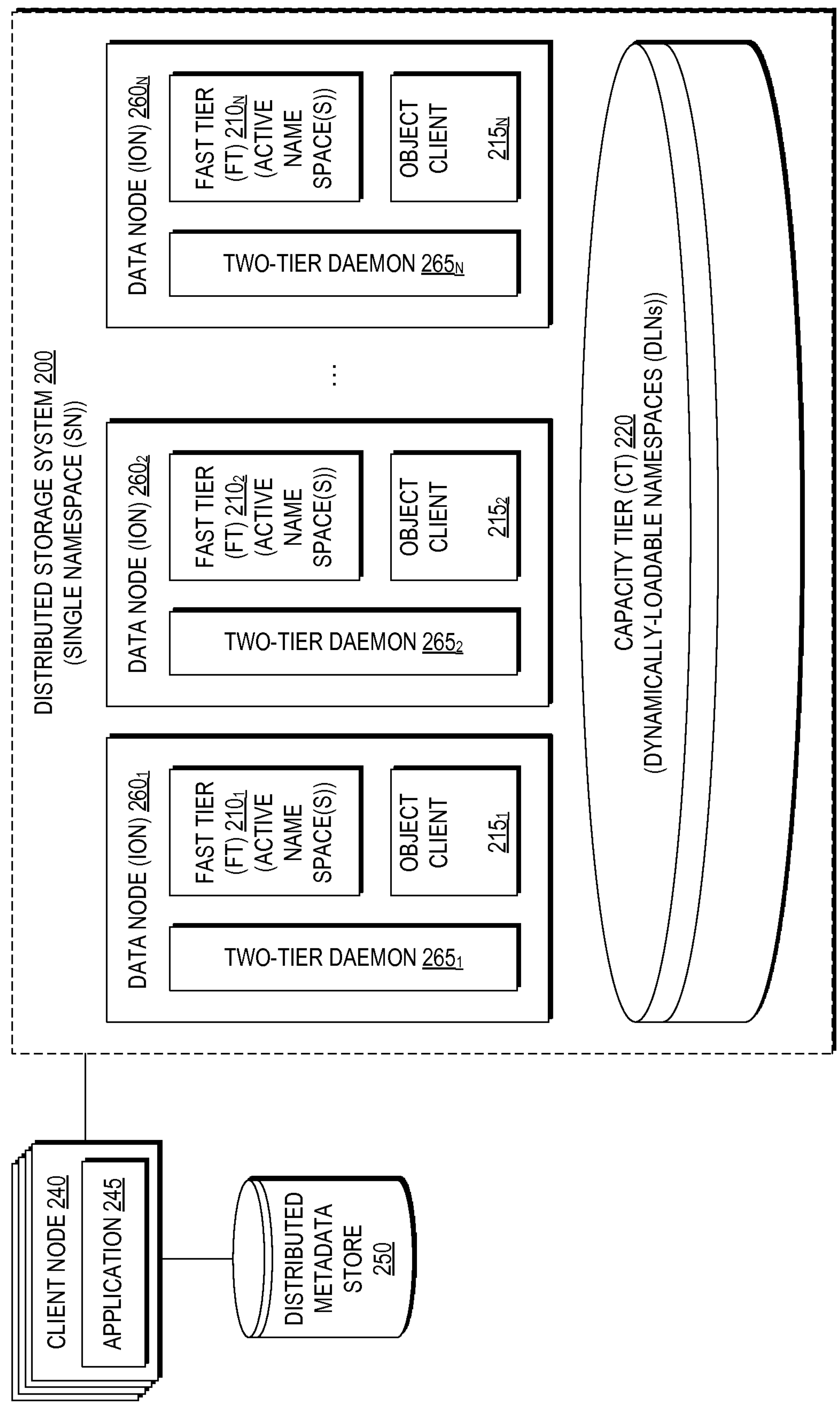

It should be understood that, in certain example embodiments, the architecture illustrated in FIG. 1 may be a Hadoop architecture comprising a name node (which may provide the single namespace (SN) for the two-tier distributed storage system 100), a job tracker, and a Hadoop Distributed File System (HDFS) comprised of a plurality of data nodes (data nodes 260 of FIG. 2). Generally, the exemplary job tracker communicates with the name node to determine the location of data, in a known manner. In addition, the exemplary job tracker optionally assigns each job to a particular data node 260. When the work is complete, the job tracker optionally updates status information. For a more detailed discussion of conventional aspects of the exemplary Hadoop architecture, see, for example, Ovum IT Information Management, "Enterprise-Grade Hadoop: The Building Blocks," (Sep. 24, 2014), incorporated herein by reference in its entirety.

The exemplary name node may maintain the directory tree of all files in the file system, in a known manner, and track where file data is kept across the plurality of data nodes. Client applications 145 operating on client nodes 140 communicate with the name node, for example, when they need to locate a file, or when they want to add, copy, move or delete a file, in a known manner. The name node responds to file requests by returning a list of relevant data nodes where the data is located.

FIG. 2 is a block diagram of a two-tier distributed storage system 200 having a single namespace comprised of a plurality of dynamically-loadable namespaces according to an example embodiment of the present invention. As illustrated in FIG. 2, the distributed storage system 200 may include a plurality of data nodes $\mathbf{260}_{1\text{-}N}$ (260 generally), with each exemplary data node 260 comprising a first performance (fast) storage tier (FT) $\mathbf{210}_{1\text{-}N}$ (210 generally) and a second capacity storage tier (CT), accessed via a client $\mathbf{215}_{1\text{-}N}$ (215 generally) discussed further below.

The client nodes 240 may rely on a distributed metadata store 250 to match jobs with dynamically-loadable namespaces. For example, when a client node 240 schedules a job, the job scheduler will have a specific name for the task. This job name may be used as an index into a table stored in the distributed metadata store 250 to determine an object identifier (OD) of a dynamically-loadable namespace (DLN) to be loaded into the fast tier 210 for processing of the job. Inside the OID may be a tree of namespace for population into the fast tier 210. When the job is finished, the files in the dynamically-loadable namespace are moved to objects, replacing the files with OIDs. As will be described in greater detail below, the directory namespace metadata also may be compressed and stored as an object with an OID matching the index table. To ensure that only a dynamically-loadable namespace (i.e., subset, or subtree, of the global metadata) resides in the fast tier 210 at any one time, the distributed storage system 200 must know which DLNs are required or desirable at any one time. Accordingly, in example embodiments of the present invention, a user may specify a DLN (i.e., subtree) when submitting a job to the scheduler.

As illustrated in FIG. 2, each exemplary data node 260 also comprises a two-tier (2T) daemon $\mathbf{265}_{1\text{-}N}$ (265 generally) that intercepts read and write operations (i.e., I/Os) from applications 245. According to one aspect of the invention, as will be described in greater detail below, the exemplary two-tier daemons 265 store newly written data synchronously into the fast tier (FT) 210 so that the client nodes 240 see low latency, high performance write operations. In addition, the exemplary two-tier daemons 265 optionally asynchronously copy the data from the fast tier 210 to the disk-based storage in the capacity tier (CT) 220 to free the data from, for example, the flash storage in the performance tier 210 when additional capacity in the performance tier 210 is required. It should be understood that a plurality of data nodes 260 may share a flash storage system, such as a flash-based DSSD storage system.

As indicated above, one or more data nodes 260 of FIG. 2 comprises a performance storage tier 210 and a capacity storage tier 220 accessed via respective object clients $\mathbf{215}_{1\text{-}N}$ (215 generally). It is to be appreciated, however, that more than two storage tiers may be used in one or more exemplary data nodes 260 in other embodiments. The exemplary performance storage tier 210 and capacity storage tier 220 comprise respective disjoint subsets of storage. The performance storage tier 210 and capacity storage tier 220 in this embodiment comprise different types of storage devices having different performance characteristics. In the present embodiment, the exemplary performance storage tier 210 comprises flash storage devices and the exemplary and capacity storage tier 220 comprises one or more disk-based object storage devices.

The flash storage devices of the performance storage tier 210 are generally significantly faster in terms of read and write access times than the disk storage devices of the capacity storage tier 220. The flash storage devices are therefore considered "fast" devices in this embodiment relative to the "slow" disk storage devices. Accordingly, the exemplary architecture may be characterized in the present embodiment as having a "fast" storage tier 210 and a "slow" storage tier 220, where "fast" and "slow" in this context are relative terms and not intended to denote any particular absolute performance level. However, numerous alternative tiering arrangements may be used, including three or more tiers each providing a different level of performance. The particular storage devices used in a given storage tier may be varied in other embodiments and multiple distinct storage device types may be used within a single storage tier.

The flash storage devices of the performance storage tier 210 generally provide higher performance than the disk storage devices of the capacity storage tier 220 but the disk storage devices of the capacity storage tier 220 generally provide higher capacity at lower cost than the flash storage devices of the performance storage tier 210. The exemplary tiering arrangement of the exemplary data nodes 260 in FIG.

2 therefore makes it possible to dynamically balance the conflicting requirements of storage capacity and I/O throughput, thereby avoiding situations in which either performance is less than optimal or the costs of implementing the system become excessive. Arrangements of this type can provide further acceleration of I/O operations in the architecture, leading to enhanced system performance relative to conventional arrangements, while additionally or alternatively providing an ability to achieve particular levels of performance at lower cost.

It should be understood that, in a preferred embodiment, I/O from the client nodes 240 is balanced across the set of data nodes 260. For example, each application 245 running on a client node 240 may write to only a single data node 260. This will further improve performance by reducing the number of network connections and network transfers. Balancing reads can be done similarly by spreading data across the distributed storage system 200 and replicate hot spots when useful. By distributing namespace responsibility across the fast tier 210, metadata accesses are similarly balanced. In certain embodiments, mapping files to data nodes 260 (and their respective two-tier daemons 265) can be done with, for example, hashing algorithms or with a second layer of metadata indirection with hashing being preferred as it reduces the number of network round-trips between the client node 240 and the data node 260.

Figure 3:
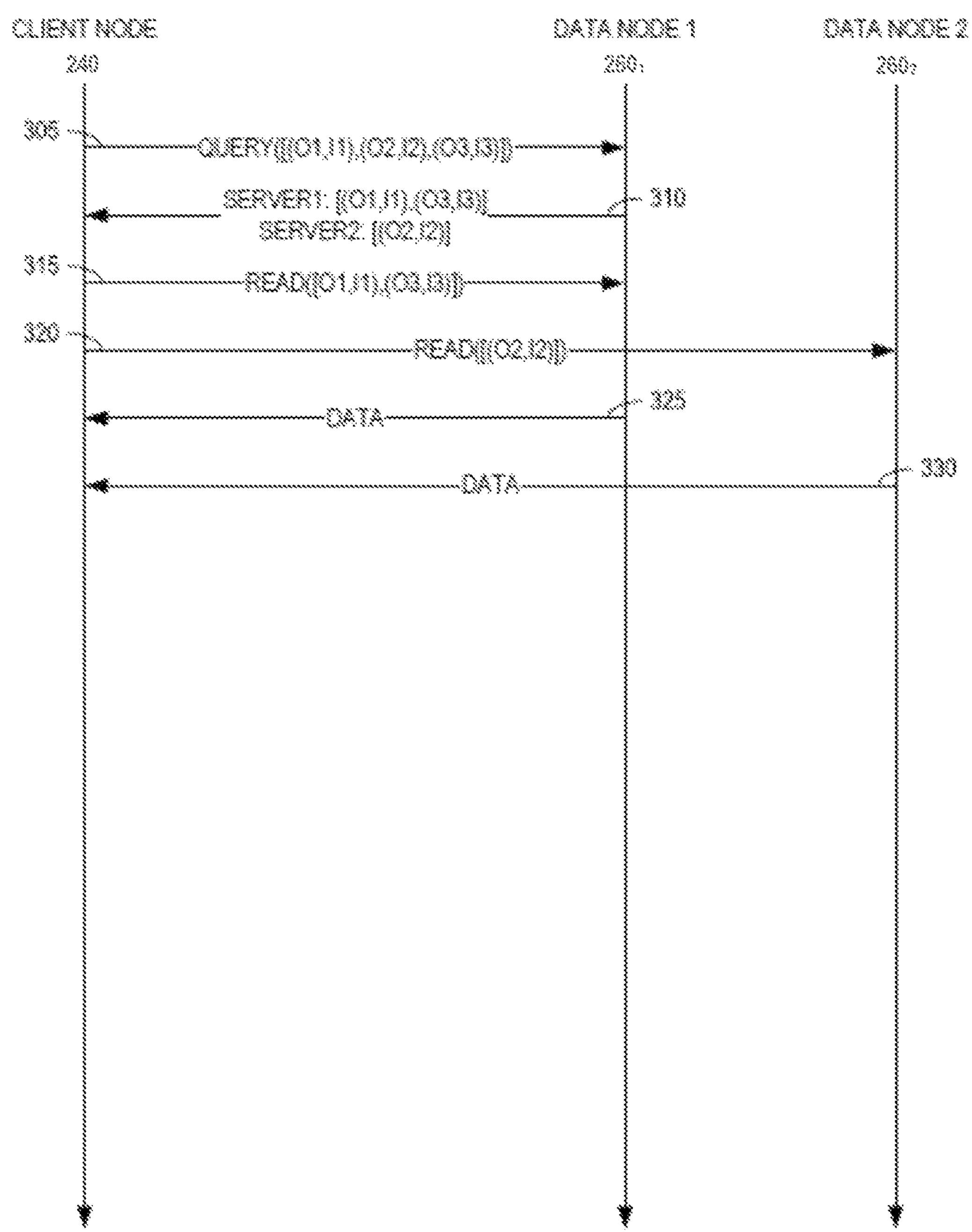
FIG. 3 is a state diagram illustrating a method for reading data in a two-tier distributed storage system according to an example embodiment of the present invention.

FIG. 3 is a state diagram illustrating a method including a redirect mechanism for reading data in a two-tier distributed storage system according to an example embodiment of the present invention and may be described with reference to FIG. 2. When a client node 240 reads, it will request (i.e., query) 305 metadata from a data node 260 and, in response to the metadata identifying data locations 310, direct its read I/O 315, 320 to data nodes 260$_1$, 260$_2$ on which the target data resides. The data nodes 260 then return data 325, 330 to the client node 240. By synchronously serializing metadata access, the data nodes 160 ensure both that readers see the most recent data and, as will be described in greater detail below, ensuring that overwrites are applied in the correct order. This mechanism binds both processes within a single job as well as processes across multiple jobs into the shared namespace ensuring that cross-job reads and writes work the same as if they were run on a monolithic traditional single tiered system.

Figure 4:
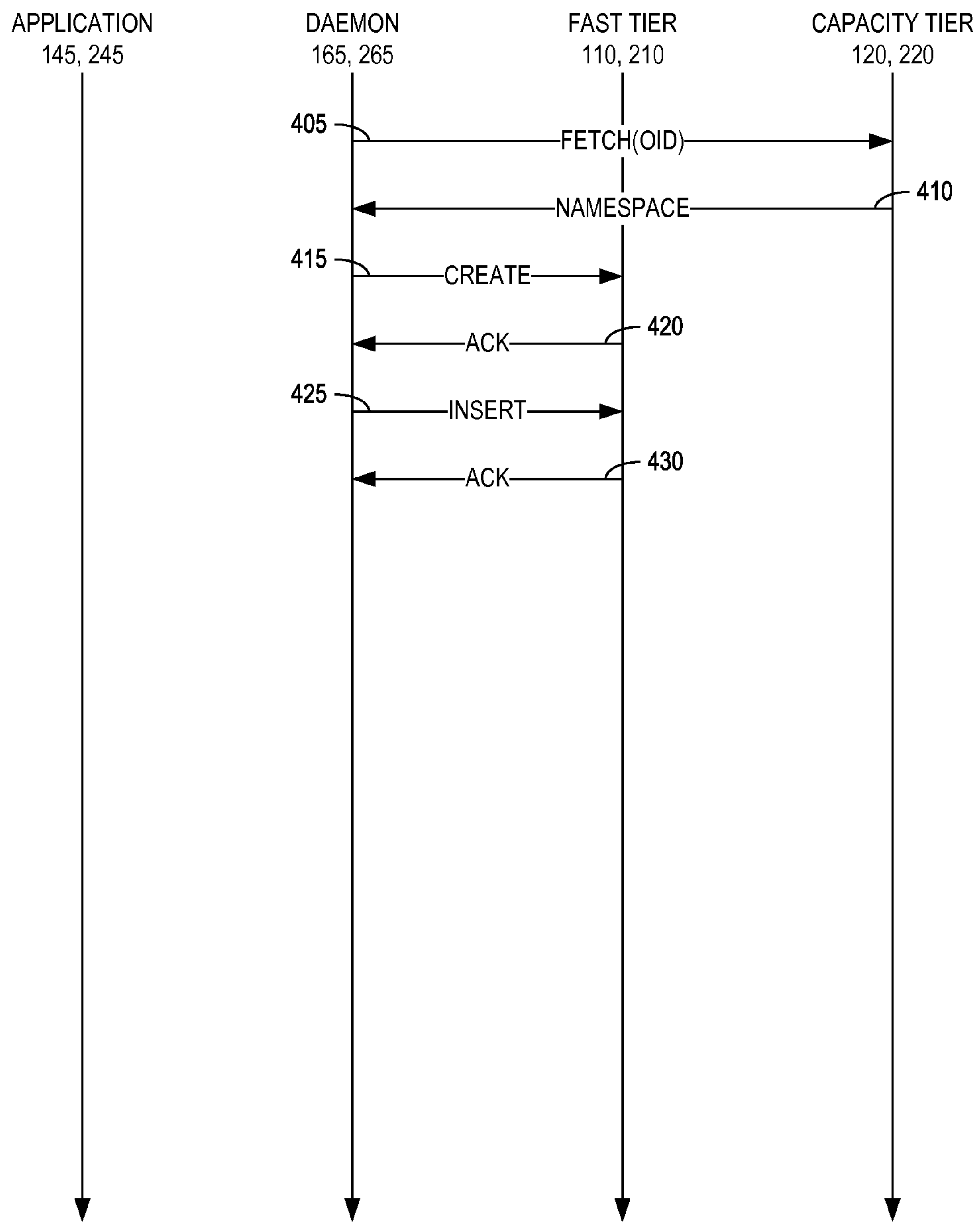
FIG. 4 is a state diagram illustrating a method for importing a dynamically-loadable namespace into a fast tier of a two-tier distributed storage system according to an example embodiment of the present invention.

FIG. 4 is a state diagram illustrating a method for importing a dynamically-loadable namespace (DLN) into a fast tier 110, 210 of a two-tier distributed storage system 100, 200 according to an example embodiment of the present invention. As illustrated in FIG. 4, the two-tier daemon 165, 265 fetches the DLN from the capacity tier 120, 220 by OID (405). The capacity tier 120, 220 then returns the requested DLN (410). The two-tier daemon 165, 265 then creates an initial entry into the fast tier 110, 210 namespace (415), receives a first acknowledgement from the fast tier (420), inserts the DLN into the namespace in the fast tier 110, 210 by populating the namespace with the objects representing the files of the namespace (425), and receives a second acknowledgement from the fast tier (430).

Figure 5:
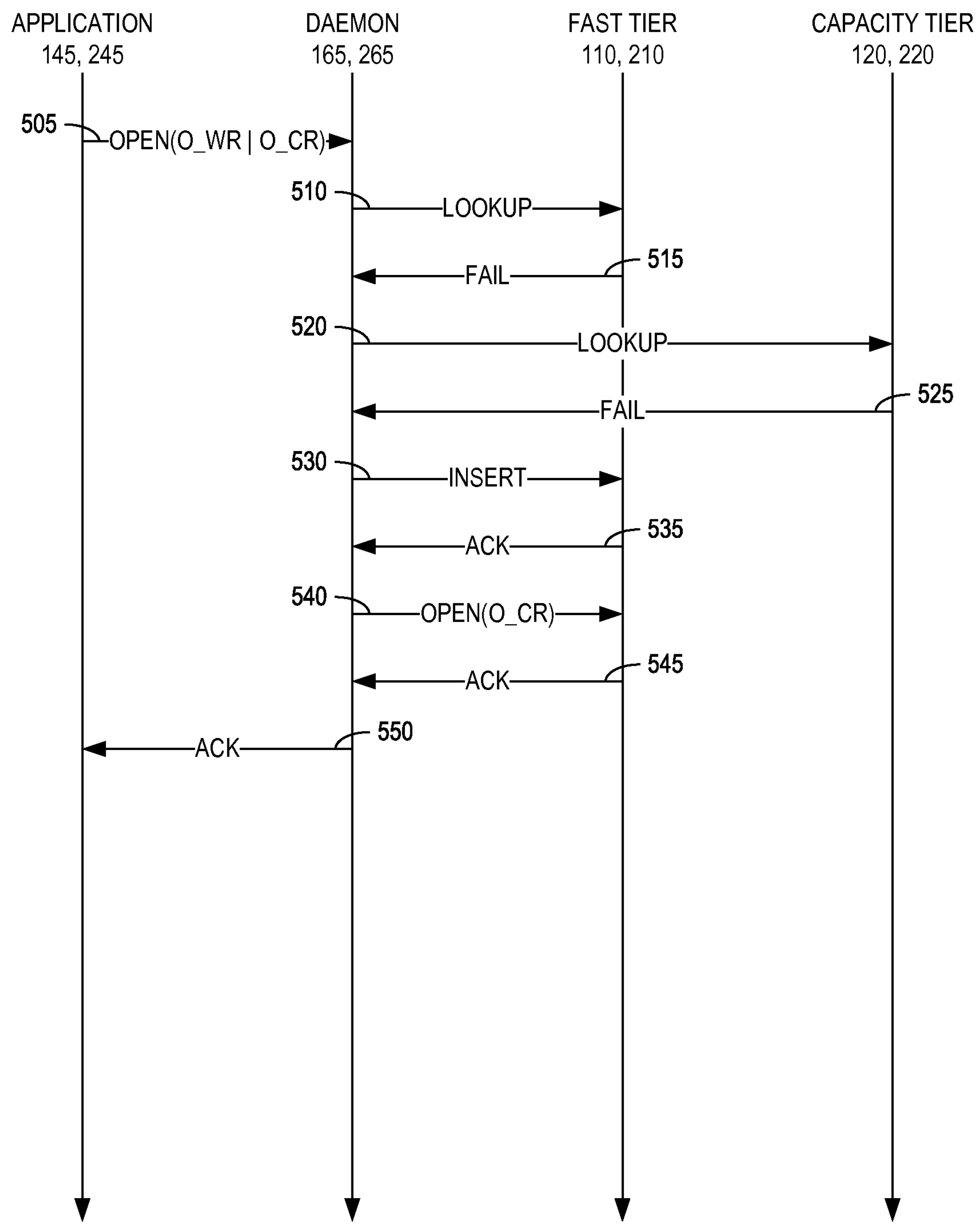
FIG. 5 is a state diagram illustrating a method for opening a new file for writing in a two-tier distributed storage system according to an example embodiment of the present invention.

FIG. 5 is a state diagram illustrating a method for opening a new file for writing in a two-tier distributed storage system 100, 200 according to an example embodiment of the present invention. As illustrated in FIG. 5, the application 145, 245 attempts to open a file for writing (O_WR) (505), requesting that the file system create the file it if does not already exist (O_CR). The two-tier daemon 165, 265 then performs a first lookup for the file determine whether the file is in the fast tier 110, 210 (510). In certain embodiments, the first lookup may fail (515) (e.g., if the file is not in the active dynamically-loadable namespace). The two-tier daemon 165, 265 then may perform a second lookup for the file to determine whether the file is in the capacity tier 120, 220 (520). In certain embodiments, the second look up may fail (525) (e.g., if the file does not exist at all in the two-tier storage system 100, 200). In response, the two-tier daemon 165, 265 may insert an entry in the file system of the fast tier 110, 210 for the requested file (530), receive a first acknowledgement from the fast tier 110, 210 that the file was created (535). The two-tier daemon 165, 265 then may open the file from the fast tier 110, 210 (540) and receive a second acknowledgement from the fast tier 110, 210 (545) which is then responded to by the two-tier daemon 165, 265 by acknowledging the application's open request (550).

Figure 6:
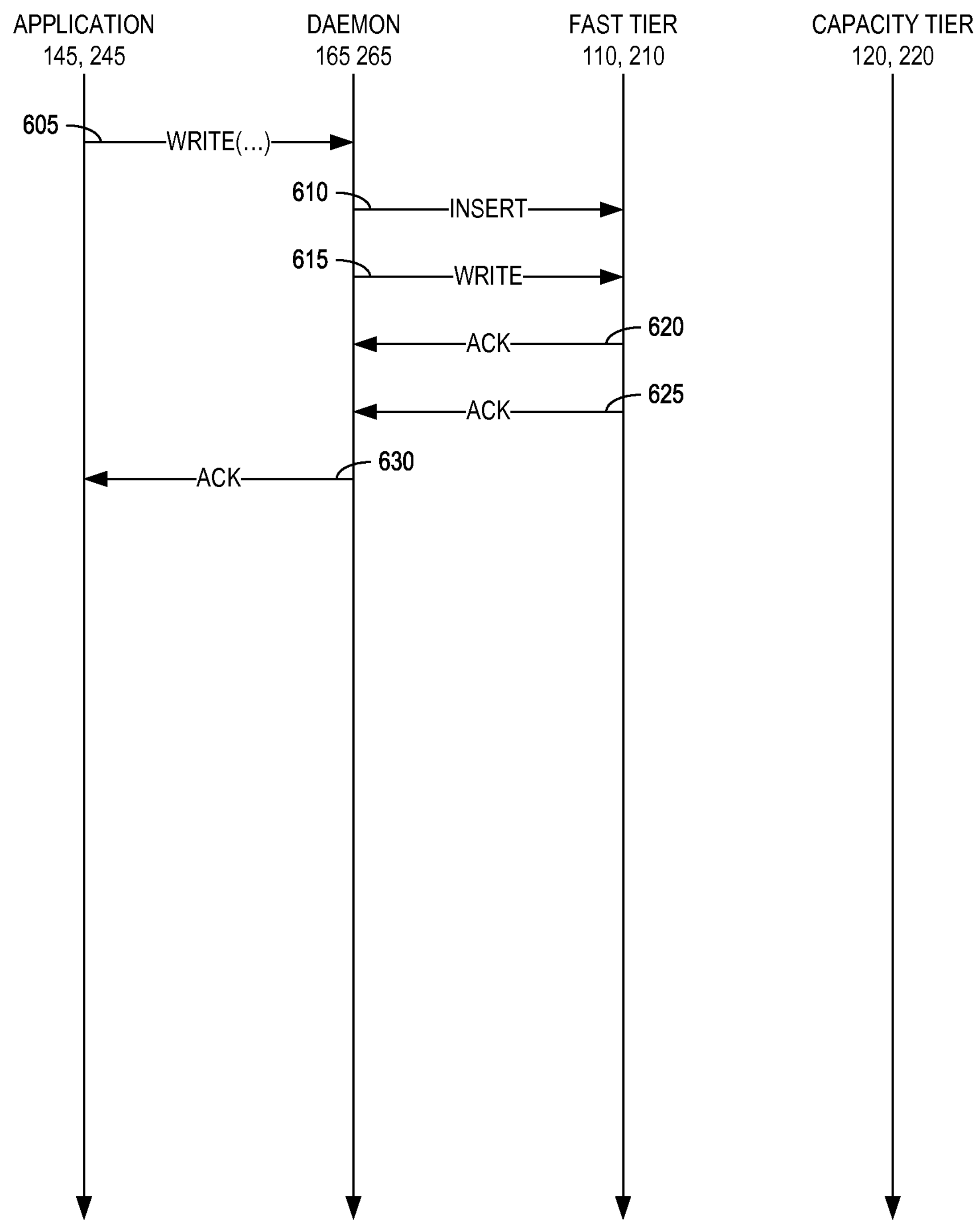
FIG. 6 is a state diagram illustrating a method for writing to a file in a two-tier distributed storage system according to an example embodiment of the present invention.

FIG. 6 is a state diagram illustrating a method for writing to a file in a two-tier distributed storage system 100, 200 according to an example embodiment of the present invention. In certain embodiments, data may only be written through the fast tier 110, 210. As illustrated in FIG. 6, the two-tier daemon 165, 265 may receive a write command from the application 145, 245 (605) and, in response, the two-tier daemon 165, 265 may insert an entry in the file system of the fast tier 110, 210 for the requested file (610) and write the file to the fast tier 110, 210 (615). In response, the two-tier daemon 165, 265 may receive acknowledgements (620, 625) in response to the insert (610) and write (615) operations which, in turn, may be acknowledged to the application (630) indicating that the write command (605) succeeded. As illustrated in FIG. 6, the two-tier daemon 165, 265 may optimistically pipeline the insert (610) and write (615) operations (i.e., not wait for acknowledgement between operations but rather proceed in parallel). As understood in the art, optimistic pipelining relies on a low potential for failure: in the success case, the pipelining is advantageous because the command (e.g., write (605)) via its parallel tasks (e.g., insert (610), write (615) finishes quicker; in the failure case, pipelining is problematic because there is more to cleanup.

Figure 7:
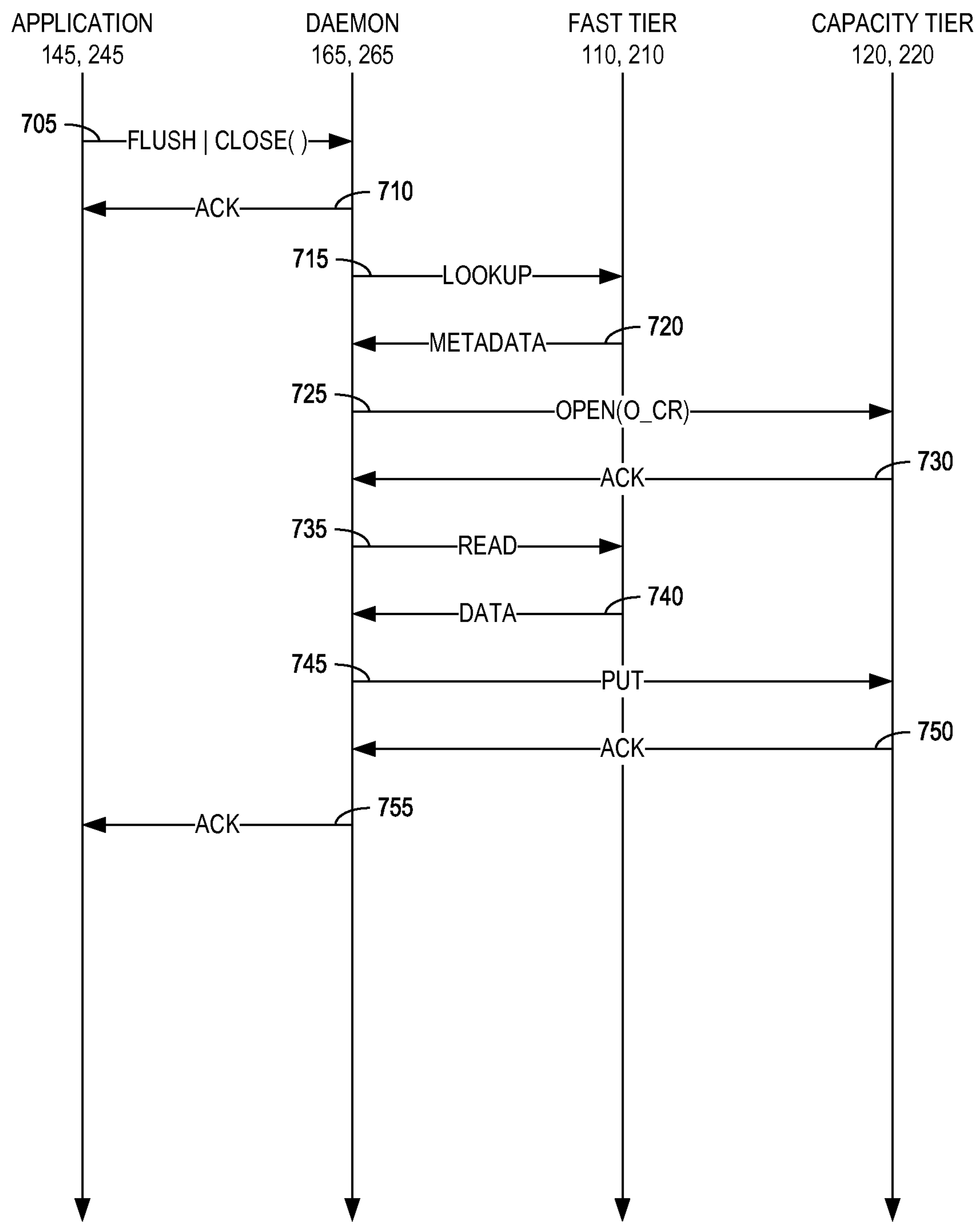
FIG. 7 is a state diagram illustrating a method for flushing dirty data in a two-tier distributed storage system according to an example embodiment of the present invention.

FIG. 7 is a state diagram illustrating a method for flushing dirty data in a two-tier distributed storage system 100, 200 according to an example embodiment of the present invention. According to example embodiments of the present invention, a file is "dirty" when the file has been modified and must be copied back to the capacity tier 120, 220. When a file is in the fast tier 110, 210 and the application 145, 245 modifies it, when the application 145, 245 is done, the modifications need to be saved to the to the capacity tier 120, 220. Conversely, if a file is copied from the capacity tier 120, 220 to the fast tier 110, 210 and not modified, then when the application 145, 245 is done, the file does not need to be copied back to the capacity tier 120, 220. Dirty means that the file has been modified and must be copied back to CT. Clean means it has not been. Dirty and clean are well-known nomenclature to describe compute caches.

As illustrated in FIG. 7, the two-tier daemon 165, 265 may receive a flush/close command from the application 145, 245 (705) and, in response, acknowledge the command (710). Close is important because it signals that the application 145, 245 will not make further modifications to the file and it may be copied to the capacity tier 120, 220; however, without the close, example embodiments of the present invention would have to guess when the application is done modifying the file—if an incorrect guess is made that the application is done and the two-tier daemon 165, 265 starts copying then, when the application 145, 245 does further modifications, that work will be wasted and will require cleanup.

As described above with respect to FIG. 6, the acknowledgement of the flush/close command may be optimistically pipelined, but need not be and, rather, may be acknowledged once the two-tier daemon 165, 265 receives acknowledgement that the tasks have completed (760). The two-tier daemon 165, 265 then may perform a lookup for the dirty data in the fast tier (110, 210) (715) and, in response, receive metadata identifying which files are dirty from the fast tier 110, 210 (720). The two-tier daemon 165, 265 then may create an object in the capacity tier 120, 220 for the dirty data identified by the metadata (725) and receive an acknowledgement from the capacity tier that the object is prepared (730). The two-tier daemon 165, 265 then may perform a read operation on the fast tier 110, 210 (735) and receive the dirty data from the fast tier 110, 210 (740). The two-tier daemon 165, 265 then may put the dirty data into the capacity tier 120, 220 (745) and receive an acknowledgement from the capacity tier 120, 220 (750) and, in response thereto, the two-tier daemon 165, 265 may acknowledge the flush command (705) to the application 145, 245 (755).

Figure 8A:
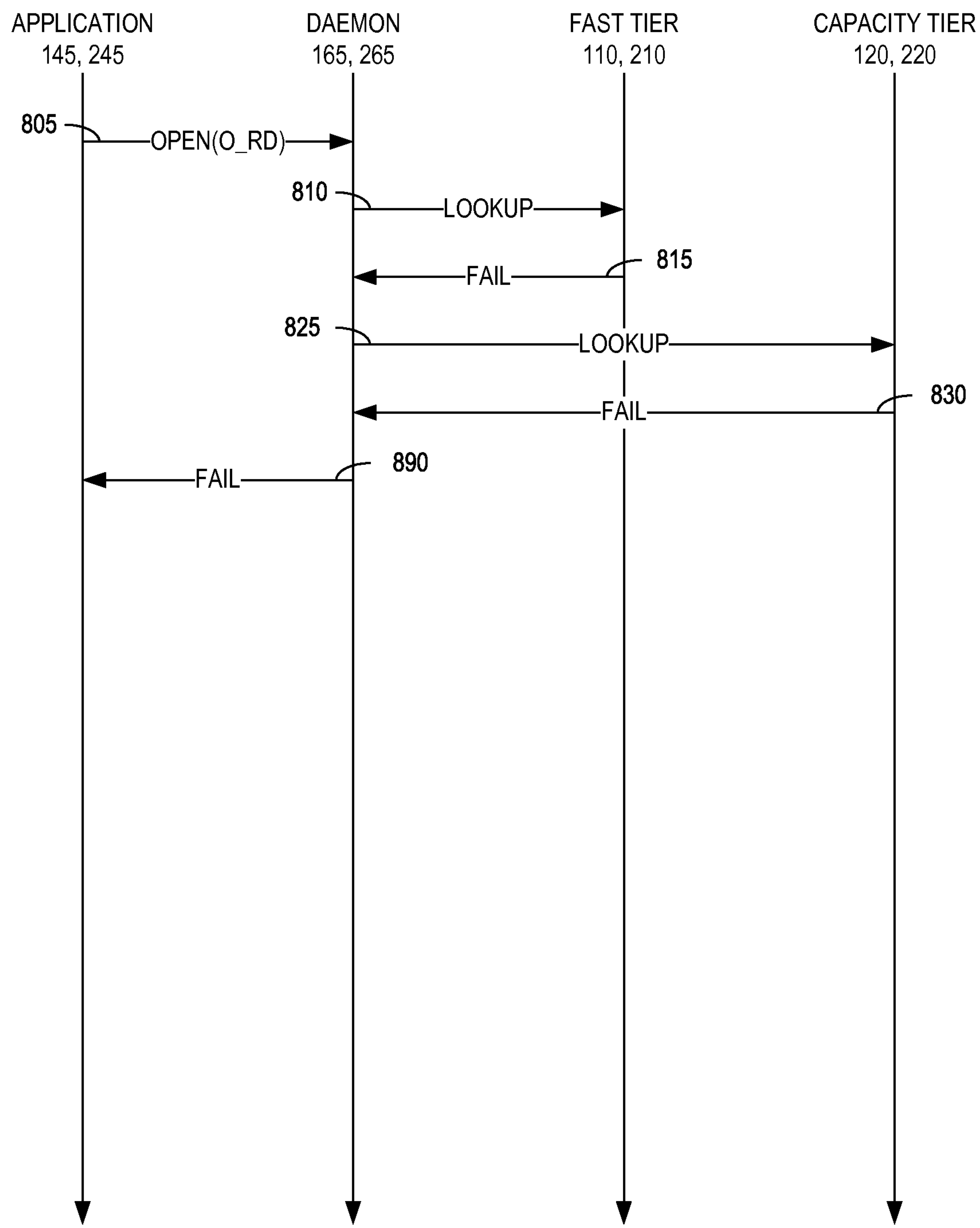
FIGS. 8A-8C are state diagrams illustrating respective method for opening a file in a two-tier distributed storage system according to respective example embodiments of the present invention.
Figure 8B:
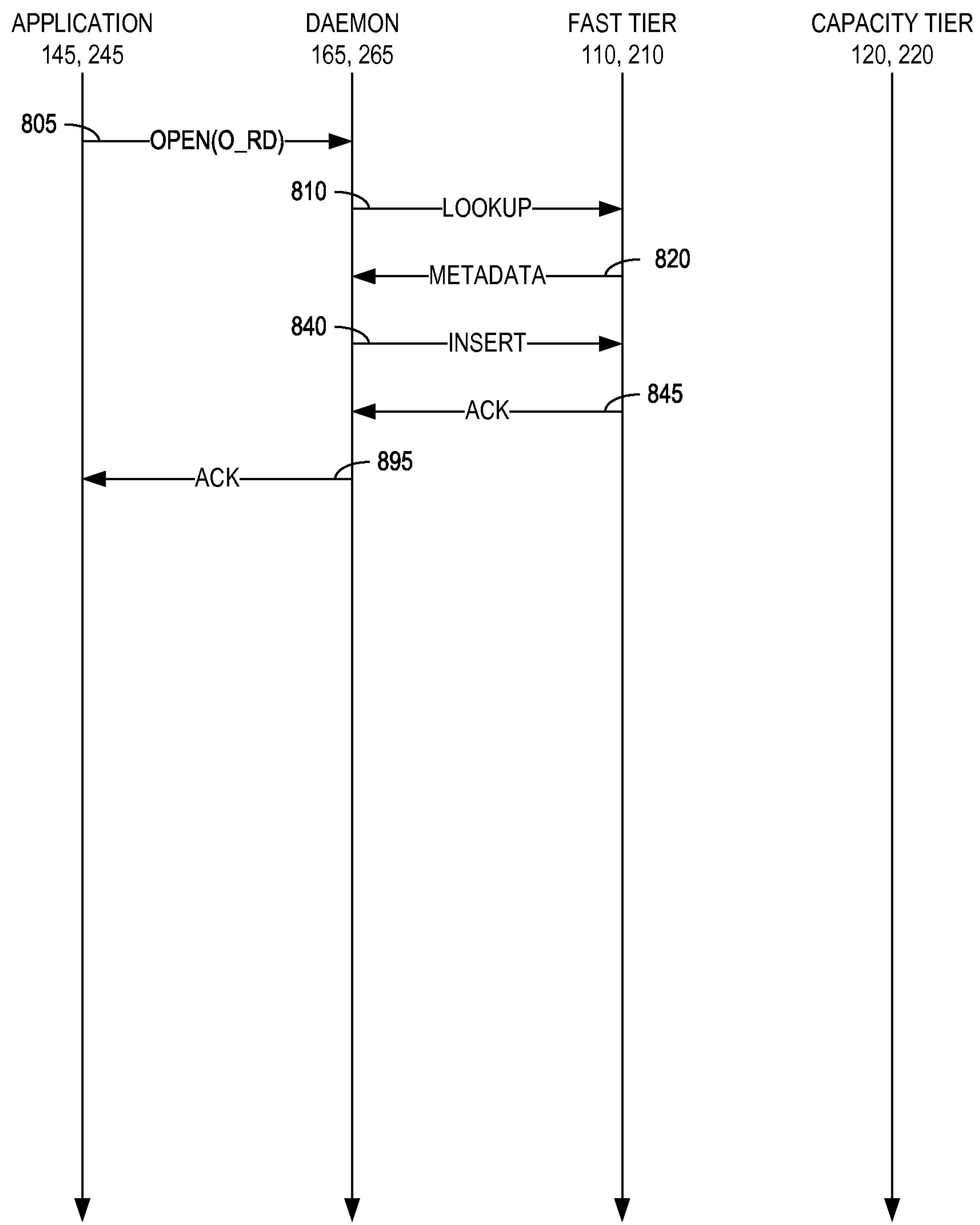
Figure 8C:
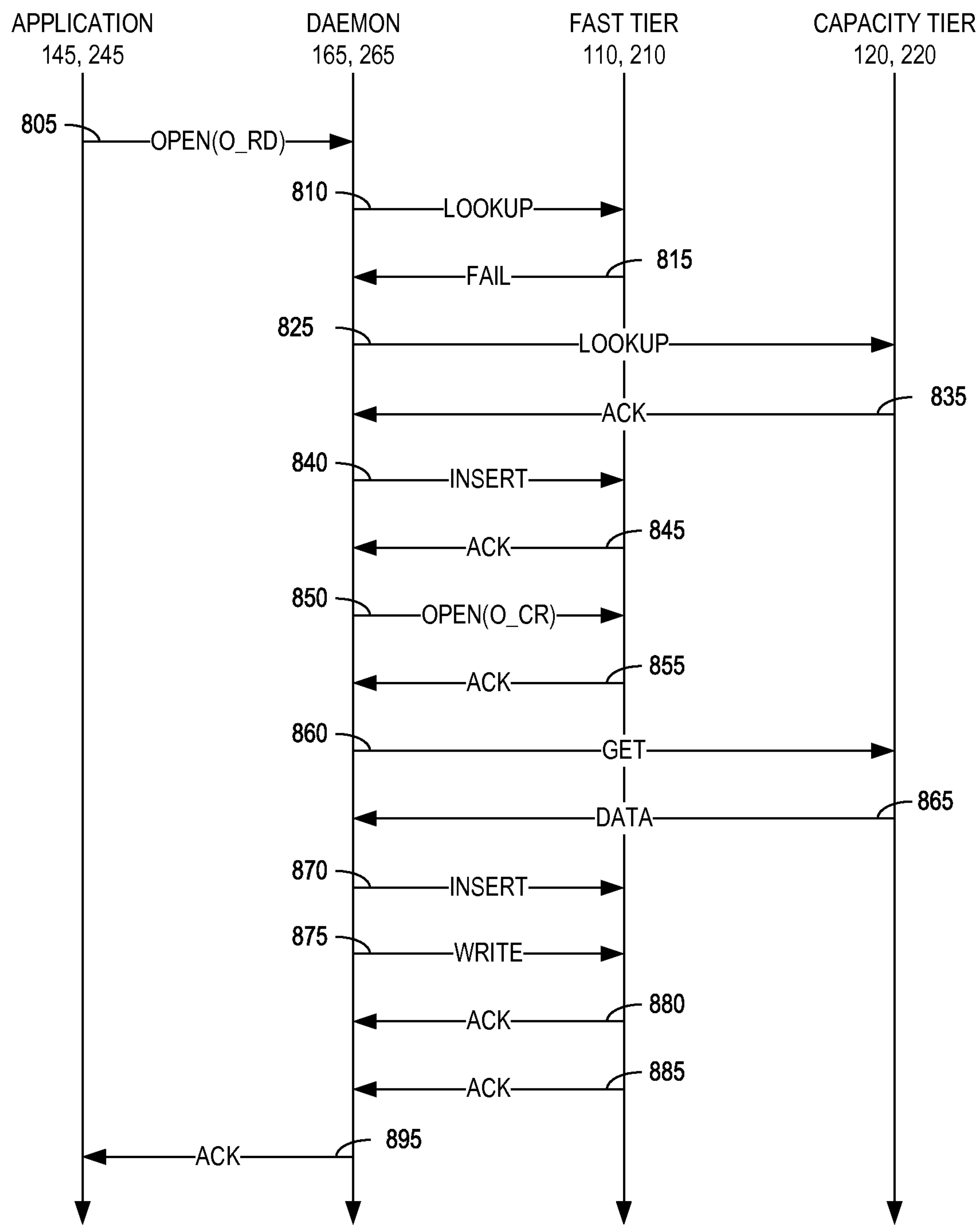

FIGS. 8A-8C are state diagrams illustrating respective method for opening a file in a two-tier distributed storage system 100, 200 according to respective example embodiments of the present invention. In a preferred embodiment, data is accessible for reading directly from either the fast tier 110, 210 or the capacity tier 120, 220. Specifically, this entails that two-tier distributed storage system 100, 200 creates a single vertical dataspace spanning both the fast tier 110, 210 and the capacity tier 120, 220. As illustrated in FIGS. 8A-8C, the application 145, 245 may send an open/read command to the two-tier daemon 165, 265 (805). In response, when an application attempts to acquire a read handle on data, the two-tier daemon 165, 265 may perform a lookup in the fast tier 110, 210 to query its metadata for the key corresponding to the requested data in an attempt to first locate the file in the fast tier 110, 210 (810).

As will be described in greater detail below with respect to FIGS. 8A-8C, this lookup may succeed or fail, with respective methods depending thereon. A metadata lookup failure (i.e., miss) indicates that this data does not exist and the application 145, 245 is informed accordingly. For existing data, the query will return the metadata describing the layout of the data (i.e., which portions of the data reside on which storage nodes 160) (as illustrated in FIG. 3, 310). For data already resident in the fast tier 110, 210, the metadata is returned to the two-tier daemon 165, 265, with subsequent reads by the application 145, 245 being routed appropriately by the two-tier daemon 165, 265.

FIG. 8A is a state diagram illustrating a method for attempting an open operation on a non-existent file in a two-tier distributed storage system 100, 200 according to an example embodiment of the present invention. If the lookup (810) fails (815), the two-tier daemon 165, 265 then may perform a second lookup to determine whether the requested file is stored in the capacity tier 120, 220 (825). If the second lookup fails as well (830), the open/read operation has failed and the two-tier daemon 165, 265 fails the open/read operation to the application 145, 245 (890).

FIG. 8B is a state diagram illustrating a method for performing a read/open operation of a file resident in the fast tier 110, 210 according to an example embodiment of the present invention. If the lookup (810) succeeds, the fast tier 110, 210 returns metadata to the two-tier daemon 165, 265 informing the two-tier daemon 165, 265 about how to access the data in the file (820). The two-tier daemon 165, 265 then may perform an insert operation on the fast tier 110, 210 to indicate that the file is open and put a lock on the file (840). The fast tier 110, 210 then may acknowledge the lock to the two-tier daemon 165, 265 (845) which, in turn, may be acknowledged to the application 145, 245 (895).

FIG. 8C is a state diagram illustrating a method for performing a read/open operation of a file resident in the capacity tier 12, 220 only according to an example embodiment of the present invention. If the lookup (810) fails (815), the two-tier daemon 165, 265 then may perform a second lookup to determine whether the requested file is stored in the capacity tier 120, 220 (825). If the second lookup succeeds and the two-tier daemon 165, 265 receives an acknowledgement from the capacity tier 120, 220 (835), the two-tier daemon 165, 265 may insert metadata into the fast tier 110, 210 to create an entry in the namespace for the file (840), to which the two-tier daemon 165, 265 may receive an acknowledgement thereto (845). The two-tier daemon 165, 265 then may perform an open operation on the fast tier 110, 210 (850) and receive an acknowledgement from the fast tier 110, 210 (855). Optionally, as described above, the two-tier daemon 165, 265 may indicate that the file is open and put a lock on the file. The two-tier daemon 165, 265 then may get the object data for the file from the capacity tier 120, 220 (860) which is then returned from the capacity tier 120, 220 to the two-tier daemon 165, 265 (865). In response, the two-tier daemon 165, 265 may create an entry for the file in the fast tier 110, 210 file system (870) and copy the file data into the file and modify the fast tier metadata to indicate that the file and its data are fast-tier-resident (875). As described above, certain embodiments may optimistically pipeline the insert (870) and write (875) steps and, therefore, receive respective acknowledgements thereto (880), (885) which then may be acknowledged to the application 145, 245 (895).

Reads of data which is not in the fast tier 110, 210 but which is in the capacity tier 120, 220 can be handled in several possible ways. It should be noted that, in this example embodiment, the file read by the application 145, 245 is "promoted" on the open call—that is, the file is moved from the capacity tier 120, 220 to the fast tier 110, 210 when the file is opened by the application 145, 245. In other embodiments, file promotion may be deferred until the first read operation performed by the application 145, 245 which would speed up the open operation (at the expense of the first read operation) but would save work in the rare case that an application 145, 245 opens a file but never actually reads it. The simplest implementation would be to promote all data in the DLN when it is imported. An alternative implementation would be for data to be fetched as needed for each read operation (either a byte range or a time or for the entire file). Finally, in certain embodiments, file promotion from capacity to acceleration is necessary for written files as well because, for files to be directly readable from the capacity tier 120, 220, files stored in the capacity tier 120, 220 are complete objects and the object interface may not allow for partial overwrites, requiring modified files to be written in their entirety when they are copied to the fast tier 110, 210.

Figure 9:
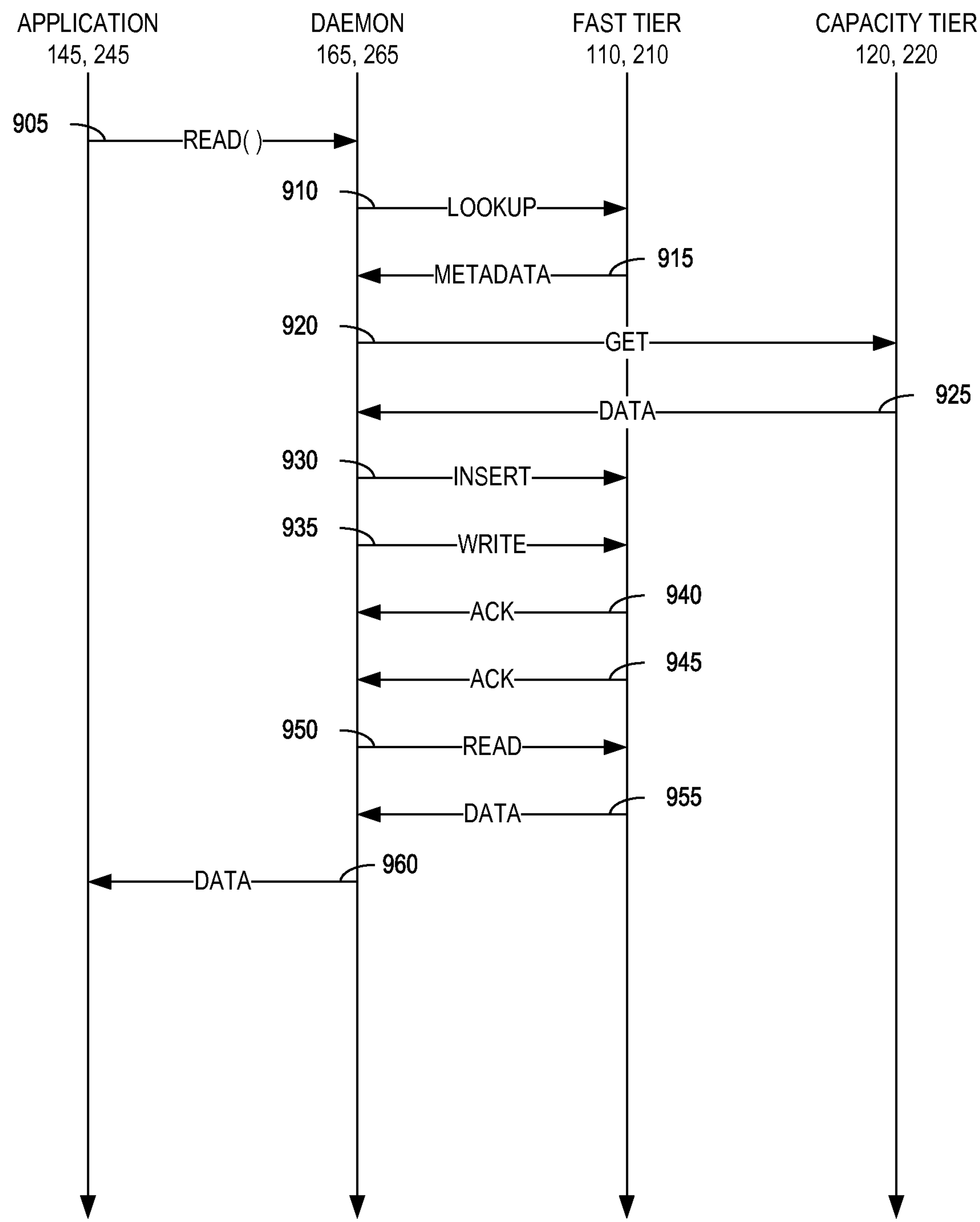
FIG. 9 is a state diagram illustrating a method for reading a file in a two-tier distributed storage system according to an example embodiment of the present invention.

FIG. 9 is a state diagram illustrating a method for reading a file in a two-tier distributed storage system 100, 200 according to an example embodiment of the present invention. As illustrated in FIG. 9, the application 145, 245 may send an open/read command to the two-tier daemon 165, 265 (805). In response, the two-tier daemon 165, 265 may perform a lookup in the fast tier 110, 210 to attempt to first locate the file in the fast tier 110, 210 (810). If the lookup (810) succeeds, the fast tier 110, 210 returns metadata to the two-tier daemon 165, 265 informing the two-tier daemon 165, 265 about how to access the data in the file (915). The two-tier daemon 165, 265 then may get the object data for the file from the capacity tier 120, 220 (920) which is then returned from the capacity tier 120, 220 to the two-tier daemon 165, 265 (925). In response, the two-tier daemon 165, 265 may create an entry for the file in the fast tier 110, 210 file system (930) and copy the file data into the file and modify the fast tier metadata to indicate that the file and its data are fast-tier-resident (935). As described above, certain embodiments may optimistically pipeline the insert (930) and write (935) steps and, therefore, receive respective acknowledgements thereto (940), (945). The two-tier daemon 165, 265 then may perform a read operation on the fast tier 110, 210 (950) and receive the data from the fast tier 110, 210 (955) which, in turn, may be sent to the application 145, 245 in satisfaction of the read operations (960).

Applications reading data directly from the object tier will need first to query the 2T metadata through an API, a CLI, or a web-based query mechanism to receive the mapping from SN to the OID in the CT. Once that mapping has been returned, the application uses the native protocols of the CT to read directly. Remember that writing directly is disallowed in a 2T architecture.

It should be understood that, to ensure that applications 145, 245 can read data directly from the capacity (i.e., object) tier 120, 220 may require a mechanism by which the applications 145, 245 can query the metadata stores 150, 250 to discover the mapping from the single namespace (SN) to the data in the capacity tier 120, 220 (e.g., the object IDs holding the data). In certain embodiments, data in the distributed storage system 100, 200 may be spread across multiple underlying objects which may be advantageous in that it may improve parallel rates of copying large files from the fast tier 110, 210 to the capacity tier 120, 220. However, this may increase the complexity of subsequent direct reads (as illustrated in FIG. 9) from the capacity tier 120, 220 because each read might require data from a different underlying object. Therefore, to provide the easiest access for existing software (e.g., HDFS workloads reading Isilon files), a two-tier distributed storage system 100, 200 may maintain a simple one-to-one mapping between the namespace and underlying objects.

Figure 10:
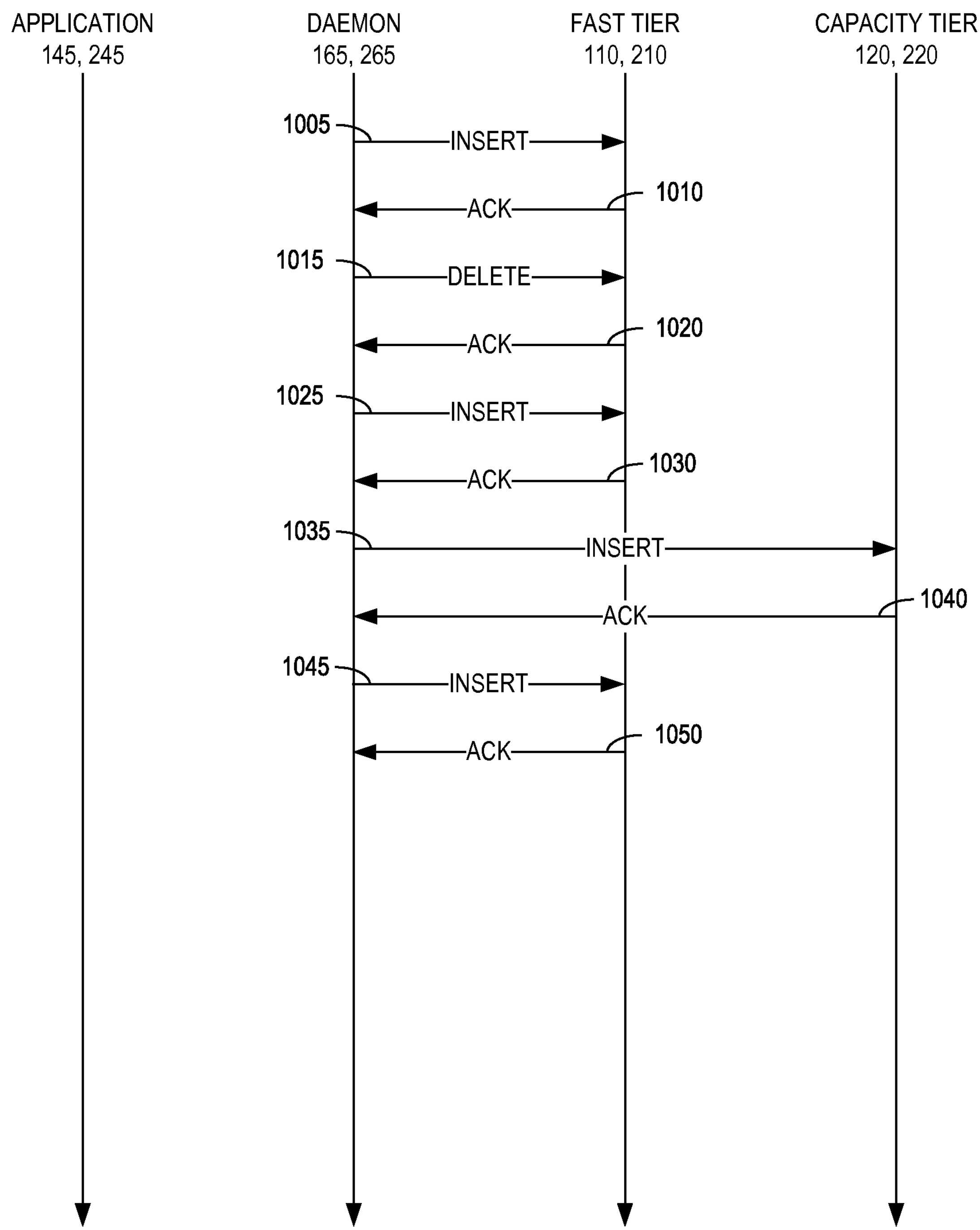
FIG. 10 is a state diagram illustrating a method for freeing fast tier capacity by evicting data in a two-tier distributed storage system according to an example embodiment of the present invention.

FIG. 10 is a state diagram illustrating a method for freeing fast tier 110, 210 capacity by evicting data in a two-tier distributed storage system 100, 200 according to an example embodiment of the present invention. As illustrated in FIG. 10, the two-tier daemon 165, 265 may insert an entry in a write-ahead log as an indicator of a multi-phase operation (1005) and receive an acknowledgement thereto (1010). The two-tier daemon 165, 265 then may delete the file from the fast tier 110, 210 (1015) and receive an acknowledgement thereto (1020). Next, the two-tier daemon 165, 265 inserts the deletion record into the metadata so the deleted file no longer appears in the fast tier 110, 210 namespace (1025), receives an acknowledgement thereto (1030), records the deletion record into the more permanent namespace in the capacity tier 120, 220 (1035), and receives an acknowledgement thereto (1040). Finally, the two-tier daemon 165, 265 records completion of the deletion in the write-ahead log (1045) and receives an acknowledgement thereto (1050).

When transferring data from the fast tier 110, 210 to the capacity tier 120, 220, the two-tier daemon 165, 265 may flatten the data from the file (regardless of its organization on the fast tier 110, 120) to a single object using proper object semantics. This allows for direct reads of the object, results in garbage collection of any stale data in the fast tier 110, 210, and also results in a reduction in the total amount of metadata needed to be stored.

Referring to FIG. 6, in example embodiments of the present invention, when an application 145 creates a new file, the two-tier daemon 165, 265 creates a key-value pair to indicate the existence of this file. A particular data node 260 will be responsible for each file (referred to as the file owner). There are at least several ways to select the file owner. A first approach is a hash of the filename to select the owner, which simplifies the lookup because the data nodes 260 share the hash algorithm so the hash is merely a local calculation. However, for files only written to by a single writer, it will be faster for the data node 260 local to that writer to be the file owner. The drawback of this is that the file-ownership cannot be determined by a simple calculation but rather requires additional metadata to be stored and an additional network metadata query to be made when opening a file to be read. A hybrid approach may also be possible where the default file owner is the data node 260 calculated by the hashing algorithm; in cases where that data node 260 is not actually the owner, it can act as a proxy for the actual owner or redirect to the owner. As data is written to the file, this key-value pair will be updated to reflect the location of the data.

Referring to FIG. 7, when the application 145 finishes writing, as indicated by either a close or a flush operation, the two-tier daemon 165, 265 begins copying the data to the from the fast tier 110, 210 to the capacity tier 120, 220. The two-tier daemon 165, 265 acquires an object ID from the capacity tier 120, 220 and updates the key-value metadata to map the file name to this object ID. After the data has been copied, the metadata is updated once again to indicate that a full and complete replica is now preserved in the capacity tier 120, 220.

Referring to FIG. 10, at this point, a request from the application 145 or from a policy engine (not shown) to free the data from the fast tier 110, 210 can be satisfied. After freeing the data, the two-tier daemon 165, 265 system will update its metadata once again to reflect that the only available copy is on the capacity tier 120, 220.

Figure 11:
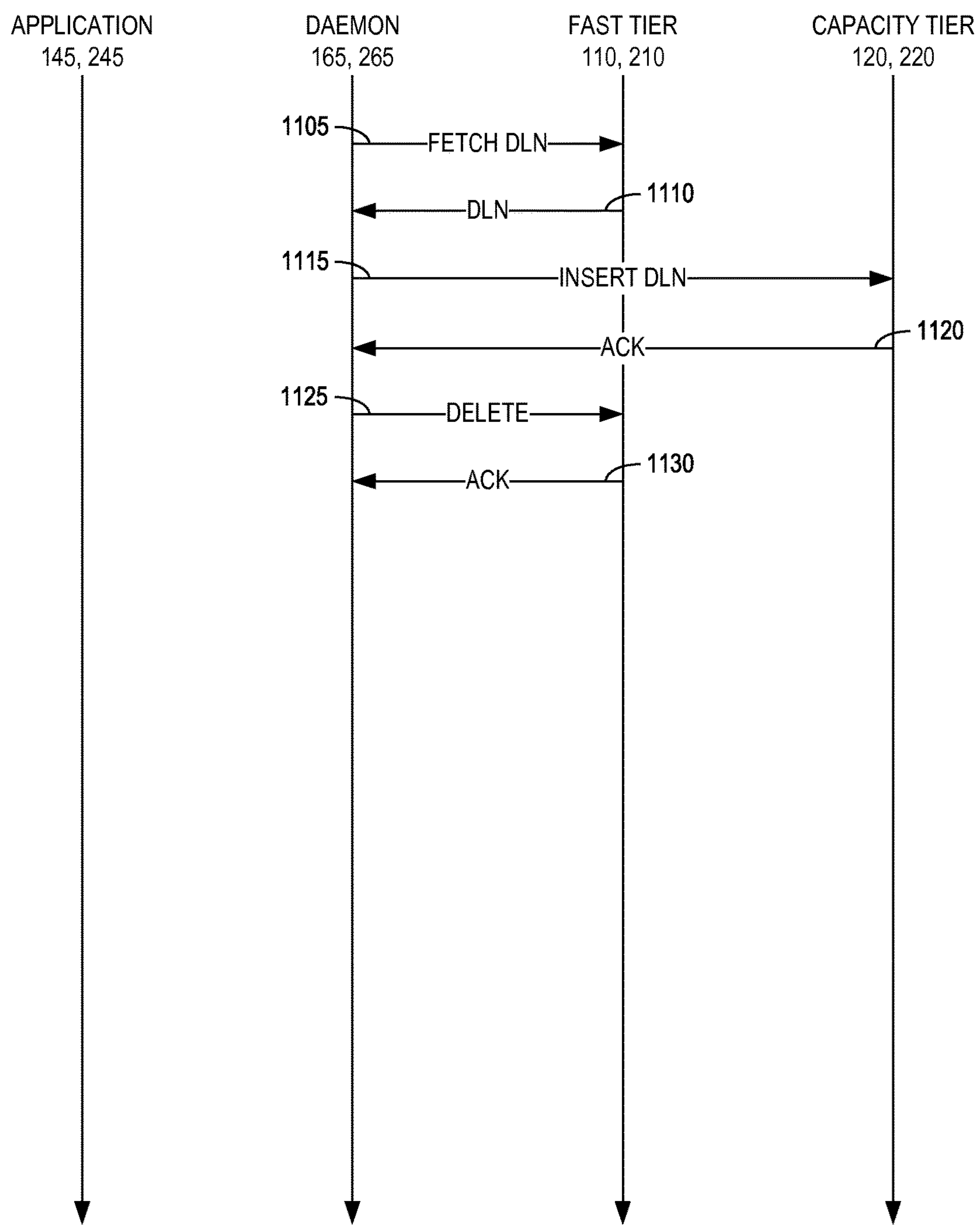
FIG. 11 is a state diagram illustrating a method for freeing fast tier capacity by evicting two-tier metadata in a two-tier distributed storage system according to an example embodiment of the present invention.

FIG. 11 is a state diagram illustrating a method for freeing fast tier 110, 210 capacity by evicting two-tier metadata in a two-tier distributed storage system 100, 200 according to an example embodiment of the present invention. As illustrated in FIG. 11, the two-tier daemon 165, 265 may fetch the DLN from the fast tier 110, 210 (1105) and receive the DLN from the fast tier 110, 210 (1110). The two-tier daemon 165, 265 then may insert the retrieved DLN into the capacity tier 120, 220 as an object (1115) and receive an acknowledgement thereto (1120). In response, the two-tier daemon 165, 265 may delete the DLN from the fast tier 110, 210 (1125) and receive an acknowledgement thereto (1130).

In a preferred embodiment, the two-tier daemon 165, 265 in example embodiments of the present invention avoids having to maintain and enforce file and object permissions but rather reorganizes application I/O and presents a logical namespace which is different from the physical namespace where data and metadata is actually stored. A main function of both is the mapping between the logical and the physical. To ensure correct permissions and security, example embodiments of the present invention use the underlying namespace of the capacity tier 120, 220 to mirror the logical namespace. Then example embodiments of the present invention may set permissions accordingly on the actual physical namespace and attempted operations on it to test whether access for applications was allowed.

FIG. 12 is an illustration of metadata 1200 for a file system directory for a plurality of files according to an example embodiment of the present invention. As illustrated in FIG. 12, this directory has 1,000,002 entries (i.e., dirents): (1) "." as a reference to itself (i.e., inode 5); (2) " . . . " as a reference to its parent directory (i.e., inode 2); and (3-1, 000,002) for one million files (i.e., inodes 12-1,000,011). Further, the directory has a total size of approximately 20 megabytes to store 12 bytes per filename, the inode number, the size of the record storing the name, and the length of the name itself. Large directories can be very challenging for metadata servers.

Table 1, below, illustrates a typical file system inode:

TABLE 1

| Size | Name | Use |
|---|---|---|
| 2 | mode | Can this file be read/written/executed? |
| 2 | uid | Who owns this file? |
| 4 | size | How many bytes are in this file? |
| 4 | time | What time was this file last accessed? |
| 4 | ctime | What time was this file created? |
| 4 | mtime | What time was this file last modified? |
| 4 | dtime | What time was this inode deleted? |
| 2 | gid | Which group does this file belong to? |
| 2 | links_count | How many hard links are there to this file? |
| 4 | blocks | How many blocks have been allocated to this file? |
| 4 | flags | How should ext2 use this mode? |
| 4 | osd1 | An OS-dependent field |
| 60 | block | A set of disk pointers (15 total) |
| 4 | generation | File version (used by NFS) |
| 4 | File_acl | File access control list |
| 4 | Dir_acl | Directory access control list |
| 4 | faddr | An unsupported field |
| 12 | I_osd2 | An OS-dependent field |

Figure 15:
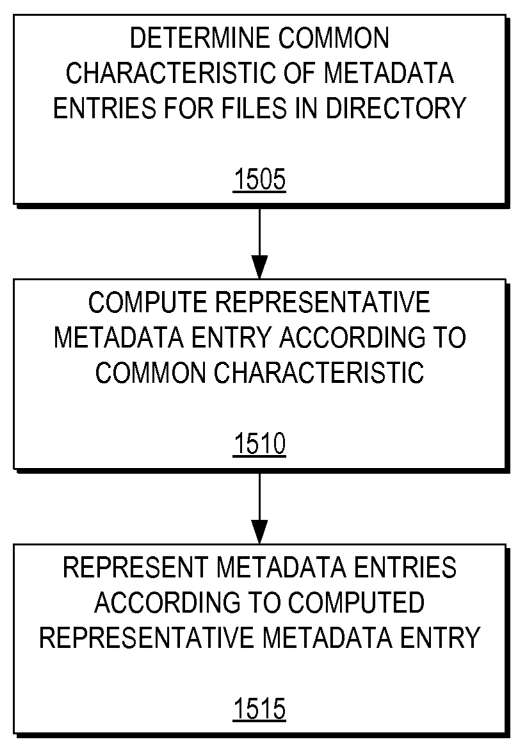
FIG. 15 is a flow diagram illustrating a method for representing metadata entries in a file system according to a computed representative metadata entry according to an example embodiment of the present invention.

FIG. 13 is an illustration of file system directory metadata 1300 for a plurality of files including a computed representative metadata entry 1310 according to an example embodiment of the present invention. FIG. 15 is a flow diagram illustrating a method for representing metadata entries in a file system according to a computed representative metadata entry according to an example embodiment of the present invention. FIGS. 13 and 15 may be described in conjunction.

As illustrated in FIG. 13, each entry in a directory with one million children (which may be typical in many file systems) may share a common trait or characteristic: (a) they are owned by the same user with the same permissions; (b) they were created at roughly the same time; (c) they have the same permissions; and (d) their filenames are generally very similar (e.g., data.0000001, data.0000002, data.0000003, data.0000004, . . . data.1000000).

Example embodiments of the present invention work for large directories in which the multiple directory entries share common characteristics. Instead of a set of separate inodes for each entry, the common characteristics can be shared. Similarly, the dirents in the parent directory file can have similar compression. Regular expressions can capture a giant set of filenames into a single pattern. This will require a sequential or patterned inode and block layout to ensure that the data for individual files can be found. Accordingly, example embodiments of the present invention may use patterns or regular expressions to condense a directory's metadata.

Therefore, example embodiments of the present invention may determine a common characteristic of metadata entries for a plurality of files in a directory of a file system (1505) and compute a representative metadata entry (i.e., compute a representative inode) 1310 for the plurality of metadata entries according to the common characteristic of the metadata entries (1510). Thus, the plurality of metadata entries in the file system having the common characteristic may be represented according to the computed representative metadata entry 1310 (1515).

Accordingly, in comparison with the metadata 1200 in FIG. 12, the metadata 1300 in FIG. 13 may be represented as just three entries instead of 1,000,002 entries (i.e., dirents): (1) "." as a reference to itself (i.e., inode 5); (2) " . . . " as a reference to its parent directory (i.e., inode 2); and (3) "data.[0000001 . . . 1000000} as a regular expression representing the one million files (i.e., inodes 12-1,000,011). Further, the total size has been reduced from 20 megabytes to fewer than 100 bytes. However, as will be appreciated, this requires a sequentially ordered set of inode numbers (i.e., 12-1,000,011).

Figure 16:
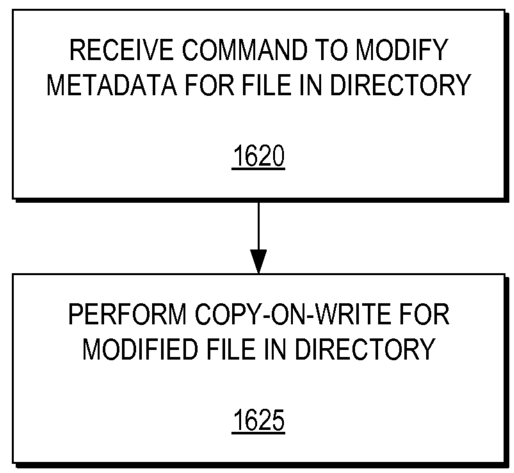
FIG. 16 is a flow diagram illustrating a method for leveraging copy-on-write techniques to handle a modification in a directory according to an example embodiment of the present invention.

FIG. 14 is an illustration of file system directory metadata 1400 for a plurality of files including computed representative metadata entries according to respective example embodiments of the present invention. FIG. 16 is a flow diagram illustrating a method for leveraging copy-on-write techniques to handle a modification in a directory according to an example embodiment of the present invention. FIGS. 14 and 16 may be described in conjunction.

As illustrated in FIG. 14, if the metadata for any file changes such that the shared metadata of the computed representative metadata entry 1310 is no longer descriptive for the range of files (e.g., if a user issues a command to rename "data.0500000" to "foo"), example embodiments of the present invention make a copy of the metadata for the outlier nonconformant with the computed representative metadata entry and then modifies that copy. Now have 999999 sharing and 1 on its own. Therefore, in comparison with the metadata 1300 in FIG. 13, the metadata 1400 in FIG. 14 may be represented as five entries instead of three entries (i.e., dirents): (1) "." as a reference to itself (i.e., inode 5); (2) " . . . " as a reference to its parent directory (i.e., inode 2); (3) "data.[0000001 . . . 0499999]" as a regular expression representing files 1 through 4,999,999 (i.e., inodes 12-5,000,011); (4) "foo" (i.e., inode 5,000,012); and (5) "data.[0500001 . . . 1000000]" as a regular expression representing files 500,001 through 1,000,000 (i.e., inodes 500,013-1,000,011). In certain embodiment, in response to receiving the command to, for example, modify the file name for a file, example embodiments of the present invention may perform copy-on-write for the modified file name entry for the modified file in the directory of the file system.

Figure 17:
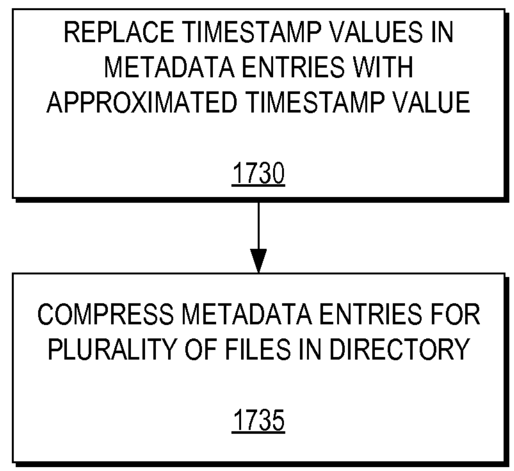
FIG. 17 is a flow diagram illustrating a method for compressing metadata entries for a plurality of files in a directory according to an example embodiment of the present invention.

FIG. 17 is a flow diagram illustrating a method for compressing metadata entries for a plurality of files in a directory according to an example embodiment of the present invention. Example embodiments of the present invention may use semantic technique to compress directory entries. Therefore, example embodiments of the present invention may replace certain metadata values with an approximated or common value (1730) and then compress the metadata entries (1735).

For typical large directories, many of these fields such as mode, uid, gid, flags, osd1, generation, file_acl, dir_acl, faddr, i_osd2, and links count will almost certainly contain the same value. These identical fields comprise 44 out of 128 bytes of the inode. In many cases, the size of the files will be the same as well which means that an additional 8 bytes are identical (size and blocks). Finally, in many cases, the four timestamps will be similar enough that they can be combined as well although user guidance may be needed to know whether approximate compression of almost identical timestamps is allowed (in rare cases, users might rely on miniscule differences in timestamps to infer relationships amongst their file sets). If approximate timestamps can be compressed, this brings the total semantically compressible amount of metadata in an inode to be slightly more than 50% (68 out of 128 bytes can be compressed via sharing).

Thus, our semantically compressible inodes for one million similar files in a shared parent directory can reduce the quantity of metadata for these files from 128 MB to 60 MB. This will require additional modifications to the parent dirents to specify that there is a new split inode structure in which the common entries share a single split inode containing the 68 common bytes and each has a unique split inode containing the unique 60 bytes for the block pointers. In summary, use of regular expressions and copy-on-write semantics reduces the amount of metadata required for a typical 1 million entry directory from approximately 150 MB (i.e., 20 MB for dirents and 128 MB for inodes) to 60 MB (i.e., 100 bytes for dirents and 60 MB for inodes).

Figure 18:
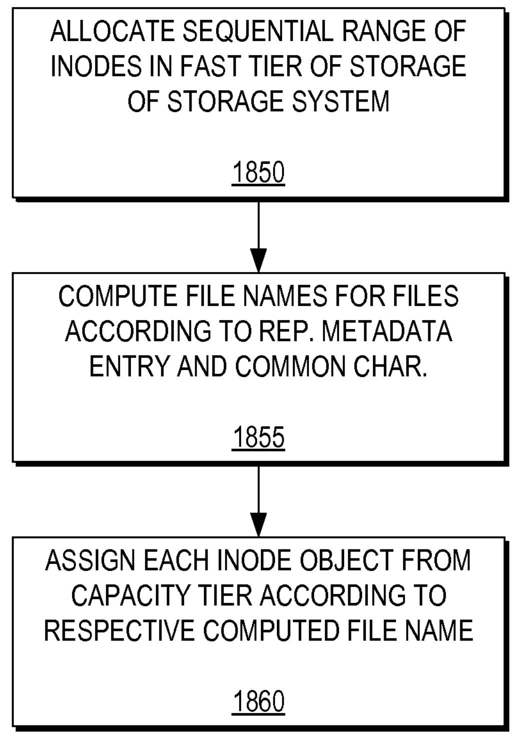
FIG. 18 is a flow diagram illustrating a method for reconstituting a plurality of objects in a capacity tier of object storage to a respective plurality of files having computed file names and assigned to a sequential range of inodes in a file system according to an example embodiment of the present invention.

FIG. 18 is a flow diagram illustrating a method for reconstituting a plurality of objects in a capacity tier of object storage to a respective plurality of files having computed file names and assigned to a sequential range of inodes in a file system according to an example embodiment of the present invention. As illustrated in FIG. 18, example embodiments of the present invention allocate a sequential range of inodes in a fast tier (1850) of storage in a storage system and then compute the file names for files to be inserted into the namespace according to the representative metadata entry and the common characteristic (1855). Each object in a capacity tier of storage in the storage system then may be assigned an inode according to its respective computer file name (1860).

It should be understood that ensuring sequentially ordered inode numbers may be difficult in some cases. Therefore, example embodiments of the present invention leverage complementary methods to improve the system's ability to find sequentially ordered inode numbers in order to enable this compression. In one embodiment, methods like Batch-FS may buffer a large number of namespace modifications and issues them in one single call, thereby allowing the file system to allocate an ordered sets of inodes and match them appropriately to patterned sets of filenames. Yet other embodiments may rely on an indirect inode table may be used to sequentially ordered inode numbers; however, this will use up a lot of the savings from compression.

Figure 19:
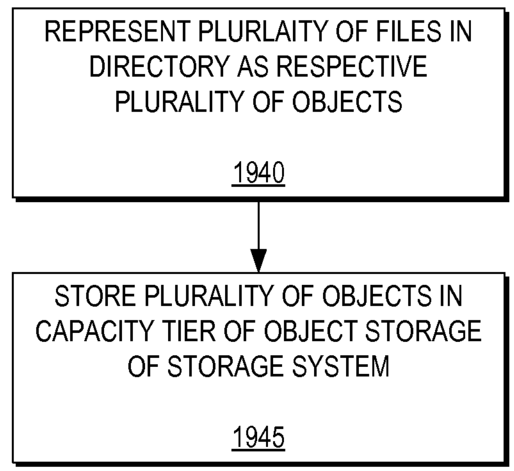
FIG. 19 is a flow diagram illustrating a method for storing a plurality of files in a directory as a respective plurality of objects in a capacity tier of object storage according to an example embodiment of the present invention.

FIG. 19 is a flow diagram illustrating a method for storing a plurality of files in a directory as a respective plurality of objects in a capacity tier of object storage according to an example embodiment of the present invention. As illustrated in FIG. 19, example embodiments of the present invention may represent the plurality of files in the directory as a plurality of respective objects (1940) which then may be stored in the capacity tier of object storage in the storage system (1945).

FIGS. 18 and 19 may be described with reference to FIGS. 4 and 11, respectively. As an illustrative example, and as described above, applications 145, 245 may create data sets stored in large directories in a fast tier 110, 210. Later, the distributed storage system 100, 200 may page the data sets into a virtual, global, single namespace (SN), comprised of a plurality of dynamically-loadable namespaces (DLNs), residing in a set of packed objects in a capacity tier 120, 220.

As illustrated in FIGS. 11 and 19, when these directories are tiered from the fast tier 110, 210 to the capacity tier 120, 220, the two-tier daemon 165, 265 may allocate a large number of OIDs to represent the plurality of files in the directory (194) and then use this in an ordered fashion to store the sorted filenames sequentially as objects into the capacity tier 120, 220 (1945), thereby ensuring that the regular expression compression will work.

As illustrated in FIGS. 4 and 18, the same works in reverse. When restoring the objects from the capacity tier 120, 220 into the fast tier 110, 210, the two-tier daemon 156, 256 can rebuild portions of the single namespace (SN) (i.e., DLNs) back into the fast tier 110, 210 for subsequent future modifications. The two-tier daemon 165, 265 can ensure sequential ranges of inodes are allocated to correspond with the ordered set of filenames as described by the regular expression (1850). This then allows the metadata server to compute the file names for the files according to the representative metadata entry and the common characteristic (1855) and serve the files from the massively compressed data structure by assigning each object from the capacity tier 120, 220 an inode according to the respective computed file name (1860).

Figure 20:
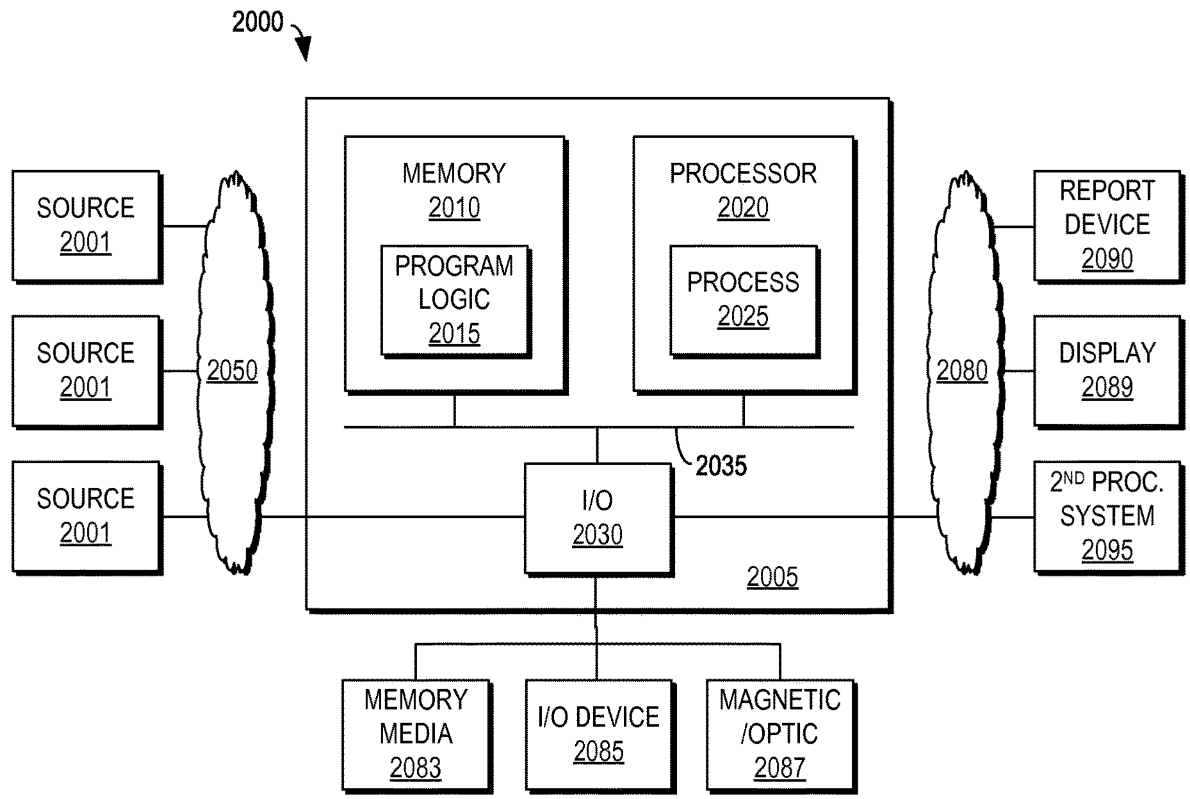
FIG. 20 is a block diagram of a system according to an example embodiment of the present invention.

FIG. 20 is a block diagram of an example embodiment apparatus 2005 according to the present invention. The apparatus 2005 may be part of a system 2000 and includes memory 2010 storing program logic 2015, a processor 2020 for executing a process 2025, and a communications I/O interface 2030, connected via a bus 2035.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform processing and to generate output information.

The methods and apparatus of this invention may take the form, at least partially, of program code (i.e., instructions) embodied in tangible non-transitory media, such as floppy diskettes, CD-ROMs, hard drives, random access or read only-memory, or any other machine-readable storage medium. When the program code is loaded into and executed by a machine, such as the computer of FIG. 20, the machine becomes an apparatus for practicing the invention. When implemented on one or more general-purpose processors, the program code combines with such a processor to provide a unique apparatus that operates analogously to specific logic circuits. As such, a general purpose digital machine can be transformed into a special purpose digital machine.

Figure 21:
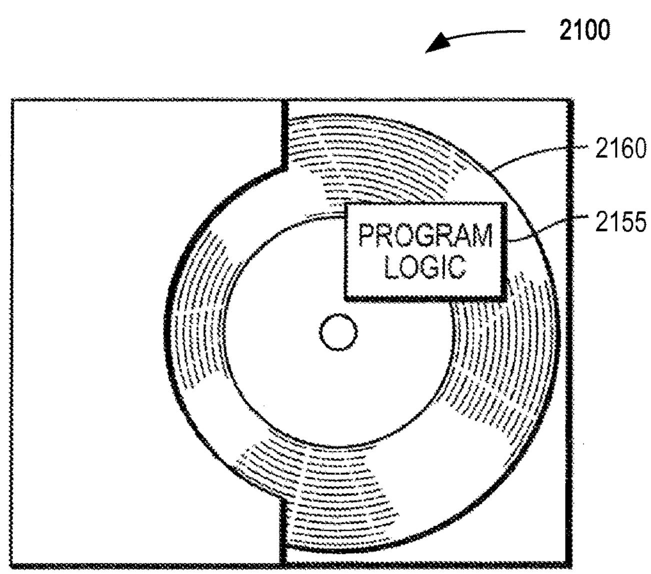
FIG. 21 is an illustrating of an example embodiment of the present invention embodied in computer program code.

FIG. 21 is a block diagram of a computer program product 2100 including program logic 2155, encoded on a computer-readable medium 2160 in computer-executable code configured for carrying out the methods of the invention, according to an example embodiment of the present invention. The logic for carrying out the method may be embodied as part of the aforementioned system, which is useful for carrying out a method described with reference to embodiments shown.

Although the foregoing invention has been described in some detail for purposes of clarity of understanding, it will be apparent that certain changes and modifications may be practiced within the scope of the appended claims. The scope of the invention is limited only by the claims and the invention encompasses numerous alternatives, modifications, and equivalents. Numerous specific details are set forth in the above description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. Accordingly, the above implementations are to be considered as illustrative and not restrictive, and the invention is not to be limited to the details given herein, but may be modified within the scope and equivalents of the appended claims.

What is claimed is:

1. A method comprising:

presenting, to an application, a file system having a global single namespace (SN) comprising a plurality of dynamically-loadable namespaces (DLNs) maintained in a capacity tier (CT) of object storage of a storage system;

wherein the global single namespace corresponds to a root and a plurality of directories; and wherein the global single namespace is partitioned into the plurality of dynamically-loadable namespaces corresponding to a plurality of subsets of the plurality of directories;

in response to a job submitted by the application, dynamically loading a dynamically-loadable namespace associated with the job from the capacity tier of object storage into a fast tier (FT) of storage of the storage system;

wherein the dynamically-loadable namespace includes namespace metadata associated with the dynamically-loadable namespace;

wherein the namespace metadata comprises data corresponding to a plurality of names for a plurality of files;

wherein the fast tier employs storage devices having a lower access time than storage devices of the capacity tier;

receiving a read command from the application to read a file in the file system;

performing a first lookup for the file in the fast tier;

receiving a first response from the fast tier indicating success or failure of the first lookup;

if the first lookup succeeds because the file is resident in the fast tier in the dynamically-loadable namespace loaded into the fast tier:

receiving file metadata from the fast tier identifying the file; and acknowledging the read command from the application;

if the first lookup fails because the file is not resident in the fast tier in the dynamically-loadable namespace loaded into the fast tier:

performing a second lookup for the file in the capacity tier;

receiving a second response from the capacity tier indicating success or failure of the second lookup;

if the second lookup succeeds because the file is resident in the capacity tier;

retrieving the file from the capacity tier;

writing the file to the fast tier; and acknowledging the read command from the application;

if the second lookup fails because the file does not exist in either the fast tier or the capacity tier, failing to read the file in response to the read command;

determining a common characteristic of a plurality of metadata entries for the namespace metadata;

computing a representative metadata entry for the plurality of metadata entries according to the determined common characteristic of the plurality of metadata entries; and representing the plurality of metadata entries having the determined common characteristic according to the computed representative metadata entry to reduce a storage size of the namespace metadata in the file system.

2. The method of claim 1 further comprising maintaining a map identifying associations between each dynamically-loadable namespace of the plurality of dynamically-loadable namespaces and an object identifier (OID) identifying each dynamically-loadable namespace in the capacity tier of object storage.

3. The method of claim 1 wherein dynamically loading a dynamically-loadable namespace associated with the job from the capacity tier of object storage into a fast tier of storage comprises:

fetching the dynamically-loadable namespace from the capacity tier of object storage;

receiving the dynamically-loadable namespace from the capacity tier of object storage;

creating an active namespace in the fast tier of storage for the dynamically-loadable namespace; and inserting the dynamically-loadable namespace into the fast tier of storage.

4. The method of claim 1 further comprising opening a file for writing comprising:

receiving an open command from the application to write the file for writing to the storage system;

performing a first lookup for the file for writing in the fast tier;

receiving a first response that the first lookup failed;

performing a second lookup for the file for writing in the capacity tier;

receiving a second response that the second lookup failed;

performing an inserting operation into the fast tier;

opening the file for writing from the fast tier; and acknowledging the open command from the application.

5. The method of claim 1 further comprising writing to a write file comprising:

receiving a write command from the application;

performing an inserting operation into the fast tier;

writing the write file to the fast tier; and acknowledging the write command from the application.

6. The method of claim 1 further comprising flushing dirty data comprising:

receiving a flush command for dirty data from the application;

acknowledging the flush command prior to performing the flush command on the storage system;

performing a lookup for the dirty data in the fast tier;

receiving metadata from the fast tier identifying the dirty data;

creating an object in the capacity tier for the dirty data;

storing the dirty data to the object in the capacity tier; and receiving an acknowledgement from the fast tier.

7. The method of claim 1 further comprising freeing capacity in the fast tier comprising:

inserting the dynamically-loadable namespace into the capacity tier as an object; and deleting the dynamically-loadable namespace from the fast tier.

8. The method of claim 1 further comprising reading a capacity tier file from the capacity tier comprising:

receiving a read command from the application;

performing a lookup for the capacity tier file in the fast tier;

receiving metadata identifying the capacity tier file in the capacity tier;

retrieving the capacity tier file from the capacity tier;

loading the capacity tier file into the fast tier;

reading the capacity tier file from the fast tier; and returning the capacity tier file to the application.

9. The method of claim 1 further comprising freeing capacity in the fast tier comprising:

retrieving the dynamically-loadable namespace from the fast tier;

inserting the dynamically-loadable namespace into the capacity tier; and deleting the dynamically-loadeable namespace from the fast tier.

10. A storage system comprising:

a fast tier of storage;

a capacity tier of storage; and computer program code for performing the operations of:

presenting, to an application, a file system having a global single namespace (SN) comprising a plurality of dynamically-loadable namespaces (DLNs) maintained in the capacity tier (CT) of object storage of the storage system;

wherein the global single namespace corresponds to a root and a plurality of directories; and wherein the global single namespace is partitioned into the plurality of dynamically-loadable namespaces corresponding to a plurality of subsets of the plurality of directories;

in response to a job submitted by the application, dynamically loading a dynamically-loadable namespace associated with the job from the capacity tier of object storage into the fast tier (FT) of storage of the storage system;

wherein the dynamically-loadable namespace includes namespace metadata associated with the dynamically-loadable namespace;

wherein the namespace metadata comprises data corresponding to a plurality of names for a plurality of files;

wherein the fast tier employs storage devices having a lower access time than storage devices of the capacity tier;

receiving a read command from the application to read a file in the file system;

performing a first lookup for the file in the fast tier;

receiving a first response from the fast tier indicating success or failure of the first lookup;

if the first lookup succeeds because the file is resident in the fast tier in the dynamically-loadable namespace loaded into the fast tier:

receiving file metadata from the fast tier identifying the file; and acknowledging the read command from the application;

if the first lookup fails because the file is not resident in the fast tier in the dynamically-loadable namespace loaded into the fast tier:

performing a second lookup for the file in the capacity tier;

receiving a second response from the capacity tier indicating success or failure of the second lookup;

if the second lookup succeeds because the file is resident in the capacity tier:

retrieving the file from the capacity tier;

writing the file to the fast tier; and acknowledging the read command from the application;

if the second lookup fails because the file does not exist in either the fast tier or the capacity tier, failing to read the file in response to the read command;

determining a common characteristic of a plurality of metadata entries for the namespace metadata;

computing a representative metadata entry for the plurality of metadata entries according to the determined common characteristic of the plurality of metadata entries; and representing the plurality of metadata entries having the determined common characteristic according to the computed representative metadata entry to reduce a storage size of the namespace metadata in the file system.

11. The system of claim 10 further comprising maintaining a map identifying associations between each dynamically-loadable namespace of the plurality of dynamically-loadable namespaces and an object identifier (OID) identifying each dynamically-loadable namespace in the capacity tier of object storage.

12. The system of claim 10 wherein dynamically loading a dynamically-loadable namespace associated with the job from the capacity tier of object storage into a fast tier of storage comprises:

fetching the dynamically-loadable namespace from the capacity tier of object storage;

receiving the dynamically-loadable namespace from the capacity tier of object storage;

creating an active namespace in the fast tier of storage for the dynamically-loadable namespace; and inserting the dynamically-loadable namespace into the fast tier of storage.

13. The system of claim 10 further comprising opening a file for writing comprising:

receiving an open command from the application to write the file for writing to the storage system;

performing a first lookup for the file for writing in the fast tier;

receiving a first response that the first lookup failed;

performing a second lookup for the file for writing in the capacity tier;

receiving a second response that the second lookup failed;

performing an inserting operation into the fast tier;

opening the file for writing from the fast tier; and acknowledging the open command from the application.

14. The system of claim 10 further comprising writing to a write file comprising:

receiving a write command from the application;

performing an inserting operation into the fast tier;

writing the write file to the fast tier; and acknowledging the write command from the application.

15. The system of claim 10 further comprising flushing dirty data comprising:

receiving a flush command for dirty data from the application;

acknowledging the flush command prior to performing the flush command on the storage system;

performing a lookup for the dirty data in the fast tier;

receiving metadata from the fast tier identifying the dirty data;

creating an object in the capacity tier for the dirty data;

storing the dirty data to the object in the capacity tier; and receiving an acknowledgement from the fast tier.

16. The system of claim 10 further comprising freeing capacity in the fast tier comprising:

inserting the dynamically-loadable namespace into the capacity tier as an object; and deleting the dynamically-loadable namespace from the fast tier.

17. The system of claim 10 further comprising reading a capacity tier file from the capacity tier comprising:

receiving a read command from the application;

performing a lookup for the capacity tier file in the fast tier;

receiving metadata identifying the capacity tier file in the capacity tier;

retrieving the capacity tier file from the capacity tier;

loading the capacity tier file into the fast tier;

reading the capacity tier file from the fast tier; and returning the capacity tier file to the application.

18. The system of claim 10 further comprising freeing capacity in the fast tier comprising:

retrieving the dynamically-loadable namespace from the fast tier;

inserting the dynamically-loadable namespace into the capacity tier; and deleting the dynamically-loadable namespace from the fast tier.

19. A computer program product including a non-transitory computer readable storage medium having computer program code encoded thereon that when executed on a processor of a computer maintains dynamically loadable namespaces, the computer program code when executed performs the steps of:

presenting, to an application, a file system having a global single namespace (SN) comprising a plurality of dynamically-loadable namespaces (DLNs) maintained in a capacity tier (CT) of object storage of a storage system;

wherein the global single namespace corresponds to a root and a plurality of directories; and wherein the global single namespace is partitioned into the plurality of dynamically-loadable namespaces corresponding to a plurality of subsets of the plurality of directories;

in response to a job submitted by the application, dynamically loading a dynamically-loadable namespace associated with the job from the capacity tier of object storage into a fast tier (FT) of storage of the storage system;

wherein the dynamically-loadable namespace includes namespace metadata associated with the dynamically-loadable namespace;

wherein the namespace metadata comprises data corresponding to a plurality of names for a plurality of files;

wherein the fast tier employs storage devices having a lower access time than storage devices of the capacity tier;

receiving a read command from the application to read a file in the file system;

performing a first lookup for the file in the fast tier;

receiving a first response from the fast tier indicating success or failure of the first lookup;

if the first lookup succeeds because the file is resident in the fast tier in the dynamically-loadable namespace loaded into the fast tier:

receiving metadata from the fast tier identifying the file; and acknowledging the open command from the application;

if the first lookup fails because the file is not resident in the fast tier in the dynamically-loadable namespace loaded into the fast tier:

performing a second lookup for the file in the capacity tier;

receiving a second response from the capacity tier indicating success or failure of the second lookup;

if the second lookup succeeds because the file is resident in the capacity tier:

retrieving the file from the capacity tier;

writing the file to the fast tier; and acknowledging the open command from the application;

if the second lookup fails because the file does not exist in either the fast tier or the capacity tier, failing to read the file in response to the read command;

determining a common characteristic of a plurality of metadata entries for the namespace metadata;

computing a representative metadata entry for the plurality of metadata entries according to the determined common characteristic of the plurality of metadata entries; and representing the plurality of metadata entries having the determined common characteristic according to the computed representative metadata entry to reduce a storage size of the namespace metadata in the file system.

20. The computer program product of claim 19 wherein the computer program code when executed further performs the step of maintaining a map identifying associations between each dynamically-loadable namespace of the plurality of dynamically-loadable namespaces and an object identifier (OID) identifying each dynamically-loadable namespace in the capacity tier of object storage.

* * * * *

UNITED STATES PATENT AND TRADEMARK OFFICE

CERTIFICATE OF CORRECTION

PATENT NO. : 10,628,391 B1
APPLICATION NO. : 14/870968
DATED : April 21, 2020
INVENTOR(S) : John M. Bent et al.

It is certified that error appears in the above-identified patent and that said Letters Patent is hereby corrected as shown below:

In the Specification

Column 5, Line 65, please delete "(OD)" and insert therefor --(OID)--

In the Claims

Column 19, Claim 9, Line 16, please delete "loadeable" and insert therefor --loadable--

Signed and Sealed this
Sixteenth Day of June, 2020

Andrei Iancu
*Director of the United States Patent and Trademark Office*